US011265249B2

(12) United States Patent
Hayes

(10) Patent No.: US 11,265,249 B2
(45) Date of Patent: *Mar. 1, 2022

(54) METHOD FOR USING AUTHENTICATED REQUESTS TO SELECT NETWORK ROUTES

(71) Applicant: Blue Armor Technologies, LLC, Houston, TX (US)

(72) Inventor: John William Hayes, Reno, NV (US)

(73) Assignee: BLUE ARMOR TECHNOLOGIES, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/350,200

(22) Filed: Oct. 15, 2018

(65) Prior Publication Data

US 2021/0314260 A1 Oct. 7, 2021

Related U.S. Application Data

(63) Continuation-in-part of application No. 14/999,317, filed on Apr. 22, 2016, now Pat. No. 10,187,299.

(51) Int. Cl.
*H04L 12/741* (2013.01)
*H04L 45/745* (2022.01)
*H04L 45/02* (2022.01)
*H04L 29/06* (2006.01)
*H04L 45/00* (2022.01)
*H04L 45/42* (2022.01)

(52) U.S. Cl.
CPC ............ *H04L 45/745* (2013.01); *H04L 45/02* (2013.01); *H04L 45/20* (2013.01); *H04L 45/42* (2013.01); *H04L 63/0236* (2013.01)

(58) Field of Classification Search
CPC ..... H04L 45/2745; H04L 45/02; H04L 45/20; H04L 45/42; H04L 63/0236; H04L 63/0227; H04L 63/102
See application file for complete search history.

(56) References Cited

U.S. PATENT DOCUMENTS

| | | | | |
|---|---|---|---|---|
| 5,822,518 A | * | 10/1998 | Ooki ..................... | G06F 21/41 726/6 |
| 5,864,871 A | | 1/1999 | Kitain ............... | G06F 17/30067 |
| 6,105,027 A | * | 8/2000 | Schneider ........... | H04L 63/0218 |
| 6,308,209 B1 | * | 10/2001 | Lecheler .............. | H04L 41/046 370/230 |
| 6,754,214 B1 | * | 6/2004 | Mahalingaiah ........ | H04L 45/04 370/392 |
| 7,376,719 B1 | * | 5/2008 | Shafer .................. | H04L 41/082 709/203 |
| 8,086,635 B1 | * | 12/2011 | Rinker ................ | G06F 21/604 707/783 |

(Continued)

*Primary Examiner* — Dung B Huynh
(74) *Attorney, Agent, or Firm* — Crain, Caton & James, P.C.; James E. Hudson, III

(57) ABSTRACT

The present invention enables the selection of network routes based on a combination of traditional route table entries, identity policy information, and trust level information determined dynamically for each network session. This enables a network operator to apply different policies to network entities presenting differing identity credentials. It also allows network operators to block access to networks and network resources when identity credentials are not provided or are unauthorized.

9 Claims, 42 Drawing Sheets

(56) References Cited

U.S. PATENT DOCUMENTS

| | | | | |
|---|---|---|---|---|
| 8,813,196 B2* | 8/2014 | Weller | G06F 16/972 | 726/4 |
| 9,094,256 B1* | 7/2015 | Ress | H04L 65/80 | |
| 9,680,812 B1* | 6/2017 | Emaminouri | H04L 63/105 | |
| 9,842,218 B1* | 12/2017 | Brisebois | H04L 63/101 | |
| 9,935,977 B1* | 4/2018 | Tribble | H04L 63/12 | |
| 10,417,613 B1* | 9/2019 | Brisebois | G06Q 10/1095 | |
| 11,030,332 B1* | 6/2021 | Gillis | G06F 21/6218 | |
| 2002/0035699 A1* | 3/2002 | Crosbie | H04W 12/065 | 726/12 |
| 2002/0169874 A1* | 11/2002 | Batson | H04L 63/08 | 709/225 |
| 2002/0184224 A1 | 12/2002 | Haff | H04L 29/06 | |
| 2002/0194003 A1* | 12/2002 | Mozer | G06F 21/32 | 704/270.1 |
| 2003/0005331 A1 | 1/2003 | Williams | H04L 63/0272 | 726/15 |
| 2003/0135588 A1* | 7/2003 | Bouthors | H04W 12/08 | 709/219 |
| 2004/0103275 A1* | 5/2004 | Ji | H04W 12/069 | 713/150 |
| 2004/0230649 A1 | 11/2004 | Wary | H04L 29/12896 | 709/203 |
| 2004/0242197 A1* | 12/2004 | Fontaine | H04W 8/183 | 455/411 |
| 2005/0135625 A1* | 6/2005 | Tanizawa | H04L 63/105 | 380/270 |
| 2005/0166053 A1* | 7/2005 | Cui | H04L 9/3247 | 713/176 |
| 2005/0169270 A1 | 8/2005 | Mutou | H04L 12/4641 | 370/390 |
| 2006/0023733 A1* | 2/2006 | Shimizu | H04L 63/083 | 370/432 |
| 2006/0041761 A1* | 2/2006 | Neumann | G06F 21/33 | 713/189 |
| 2006/0045272 A1 | 3/2006 | Ohaka | H04L 9/3271 | 380/270 |
| 2006/0094422 A1* | 5/2006 | Crooks | G06Q 10/10 | 455/431 |
| 2006/0137005 A1 | 6/2006 | Park | H04L 29/12009 | 726/21 |
| 2007/0005359 A1* | 1/2007 | Bowen | G06Q 40/02 | 704/251 |
| 2007/0022468 A1* | 1/2007 | Iijima | H04L 63/1416 | 726/3 |
| 2007/0046423 A1* | 3/2007 | Baucom | G07F 17/3232 | 340/5.5 |
| 2007/0083935 A1 | 4/2007 | Uchikawa | G06F 21/6227 | 726/26 |
| 2008/0034419 A1* | 2/2008 | Mullick | H04L 63/20 | 726/15 |
| 2008/0072280 A1 | 3/2008 | Tardo | H04L 63/0428 | 726/1 |
| 2008/0117884 A1 | 5/2008 | Ishii | H04W 12/06 | 370/338 |
| 2008/0250478 A1 | 10/2008 | Miller | H04L 9/32 | 726/5 |
| 2009/0055545 A1* | 2/2009 | Saba | G06Q 10/10 | 709/229 |
| 2009/0170496 A1* | 7/2009 | Bourque | H04L 45/00 | 455/422.1 |
| 2009/0271635 A1* | 10/2009 | Liu | G07F 7/1008 | 713/186 |
| 2010/0180332 A1* | 7/2010 | Ben-Yochanan | H04L 63/102 | 726/12 |
| 2011/0032939 A1* | 2/2011 | Nozaki | H04L 45/54 | 370/392 |
| 2011/0265147 A1* | 10/2011 | Liu | H04L 63/08 | 726/4 |
| 2012/0230336 A1* | 9/2012 | Nishiyama | H04L 45/741 | 370/392 |
| 2012/0266239 A1* | 10/2012 | Bradley, II | G06F 21/6218 | 726/21 |
| 2013/0038448 A1* | 2/2013 | Chong | G07C 9/37 | 340/541 |
| 2013/0347053 A1* | 12/2013 | Motoyama | G06F 21/6218 | 726/1 |
| 2014/0325594 A1* | 10/2014 | Klein | H04L 63/105 | 726/2 |
| 2015/0042449 A1* | 2/2015 | Suh | G07C 9/20 | 340/5.7 |
| 2015/0135282 A1* | 5/2015 | Kong | H04L 63/126 | 726/4 |
| 2015/0341358 A1* | 11/2015 | Borovikov | H04L 63/10 | 726/27 |
| 2016/0006641 A1* | 1/2016 | Wiggs | H04L 43/50 | 709/224 |
| 2017/0019791 A1 | 1/2017 | Shishido | H04L 63/104 | |
| 2017/0041213 A1 | 2/2017 | Nadalin | H04L 45/22 | |
| 2017/0236347 A1* | 8/2017 | Drako | H04L 67/10 | 340/5.33 |
| 2018/0026954 A1* | 1/2018 | Toepke | H04L 63/083 | 726/4 |
| 2018/0083960 A1* | 3/2018 | Sbeiti | H04L 63/0853 | |
| 2018/0276395 A1* | 9/2018 | Bostick | H04L 65/403 | |
| 2019/0334922 A1* | 10/2019 | Ratiner | G06F 21/6218 | |
| 2019/0349385 A1* | 11/2019 | Fox | H04W 12/08 | |
| 2019/0362017 A1* | 11/2019 | Salomon | G06N 5/02 | |
| 2020/0319324 A1* | 10/2020 | Au | G01S 7/415 | |
| 2020/0351243 A1* | 11/2020 | Lu | H04L 63/105 | |

* cited by examiner

Network Client a wants to send a Resource Request to Network Resource

Network Client sends a Resource Request to Trust Router

Trust Router authenticates Resource Request by processing Authentication Object.

Network Client sends a Resource Request to Trust Router

Trust router sends Resource Request to Network Resource via selected route

A statistical object is the output of a function. The function points to an output string of values based on an input Remote System has a copy of each Certificate that is expected to be used Problem: A Certificate is too big to send the Remote System in its original form The Solution:
Create a representation of each Certificate, called a Cryptographic Hash, which is only 32 bits long, and send to the Remote System The Solution, in Greater Detail:

Ben needs to communicate with the Remote System

Remote System receives Ben's communication

Accumulated Statistical Object Selector

Original Object Identifier

A match is found:

METHOD FOR USING AUTHENTICATED REQUESTS TO SELECT NETWORK ROUTES

CROSS-REFERENCE TO RELATED PENDING U.S. PATENT APPLICATION & CLAIM FOR PRIORITY

The Present Patent Application is a Continuation-in-Part Patent Application.

The Applicant claims the benefit of priority for Pending U.S. patent application Ser. No. 14/999,317, filed on 22 Apr. 2016, under the provisions of Sections 119 and/or 120 of Title 35 of the United States Code.

The Present Application is related to U.S. Pat. No. 8,346,951, entitled *Method for First Packet Authentication*. The text and drawings of U.S. Pat. No. 8,346,951 are hereby incorporated by reference.

The Present Patent Application is also related to U.S. Pat. No. 8,572,697, entitled *Method for Statistical Object Identification*. The text and drawings of U.S. Pat. No. 8,572,697 are hereby incorporated by reference.

FEDERALLY SPONSORED RESEARCH OR DEVELOPMENT

None.

FIELD OF THE INVENTION

The present invention relates to computer, information appliance and network security systems. More particularly, one embodiment of the present invention pertains to methods for routing authenticated requests by selecting a network route where the authenticated identity and trust level are included in the route selection process.

BACKGROUND OF THE INVENTION

Network routers are devices which direct data traffic over a network. In most networks, data is organized in packets, which are generally analogous to separate cars connected together in a train.

The primary function of a router is to forward a packet toward its destination, which is the destination IP address of the packet. A routing table uses the same idea that one does when using a map in package delivery. Whenever a computer needs to send data to another computer on a network, it must first know where to send it. If the sending computer cannot directly connect to the destination computer, it has to send it via routers along a proper route to the destination computer. Most computers do not try to figure out which route(s) might work; instead, a computer will send an IP packet to a router in the LAN, which then decides how to route the "package" of data to the correct destination. Each router needs to keep track of which way to deliver various packages of data, and for this it uses a routing table. A routing table is a database which keeps track of paths, like a map, and allows the router to send the IP packet to the next router or final destination computer. Each routing table entry lists at least the following information: the destination network or network address, a metric or cost and the next hop address which is the address of the next router to which the packet is to be sent on the way to its final destination. When a packet arrives at the router, the destination address contained within the packet is compared against the routing table entries. If only one route table entry matches the destination address, then the packet is sent to the corresponding next hop address. If there are more than one route table entries that match the destination address, then the metric information is used to select the best route. Metric based route selection is dependent upon the routing algorithm and protocol used. Classes of routing algorithms include link-state algorithms path vector protocols. If no route table entries match the destination address, then the packet is discarded as no route to the destination exists. The process of selecting a route is called route selection.

Assuming that the routing tables are consistent, the simple algorithm of relaying packets to their destination's next hop thus suffices to deliver data anywhere in a network. Hop-by-hop is the fundamental characteristic of the IP Internetwork Layer[1] and the OSI Network Layer.

The route table information describes the "reachability" of a network address from the perspective of a specific router. Just like driving directions, where, when a road is closed, "you can't get there from here" is an accurate description of the situation, a router can also produce the equivalent "you can't get there from here" as a result of a network failure or other event.

Route table entries are usually managed by routing protocols such as OSPF and IGMP. Route table entries may also be managed manually by what are commonly called static route table entries.

A system which enhances the manageability and security of networks would provide network communications that are more robust and secure. The development of such a system would constitute a major technological advance, and would satisfy long felt needs and aspirations in the network security industry.

SUMMARY OF THE INVENTION

In one embodiment of the present invention, information concerning the "reachability" of a network destination is augmented with authenticated identity information. This feature allows traffic destined for the same destination to be routed over different network paths on a per session or flow basis. The present invention also enables the selective discarding of packets based on the absence of identity information, or the failure to authenticate the provided identity information.

One embodiment of the present invention is used to process a network request, and then routes the request to its intended destination using a combination of traditional routing approaches that are influenced by identity information included with the network request that is authenticated. The authentication occurs on the first packet of a network session or flow. Once the included identity has been authenticated, the authenticated identity is used to classify the network request into an identity policy group. The policy group allows for the easy management of large populations of network identities.

Once identity and identity group has been established, a trust level can be assigned to it. This assignment may be performed by systems external to the trust router such as an analytics system or an artificial intelligence system. Using their sensors and information, an analytics system determine how an identity is behaving. Based on their behaviors and the analytical processes, a trust level is assigned to the identity. This trust level determines which routes are available to the identity at a given time. The trust level can be adjusted at any time, providing a continuously variable policy enforcement mechanism.

Once the identity policy group has been determined, the network request is routed in accordance with the route table entries and the identity policy group. A route table entry is selected that both meets the route reachability requirement of the network request and has the same identity policy group as was determined by the authenticated identity. Once a route table entry has been selected that meets these criteria, a session table entry is created, recording the routing decision and the network request is routed accordingly. All subsequent packets belonging to the same network session or flow are processed in accordance with the session table entry until the network session is terminated, at which time the session table entry is removed. If no matching route table entries are found, the network request is discarded.

An appreciation of the other aims and objectives of the present invention and a more complete and comprehensive understanding of this invention may be obtained by studying the following description of a preferred embodiment, and by referring to the accompanying drawings.

A BRIEF DESCRIPTION OF THE DRAWINGS

Figure 25:
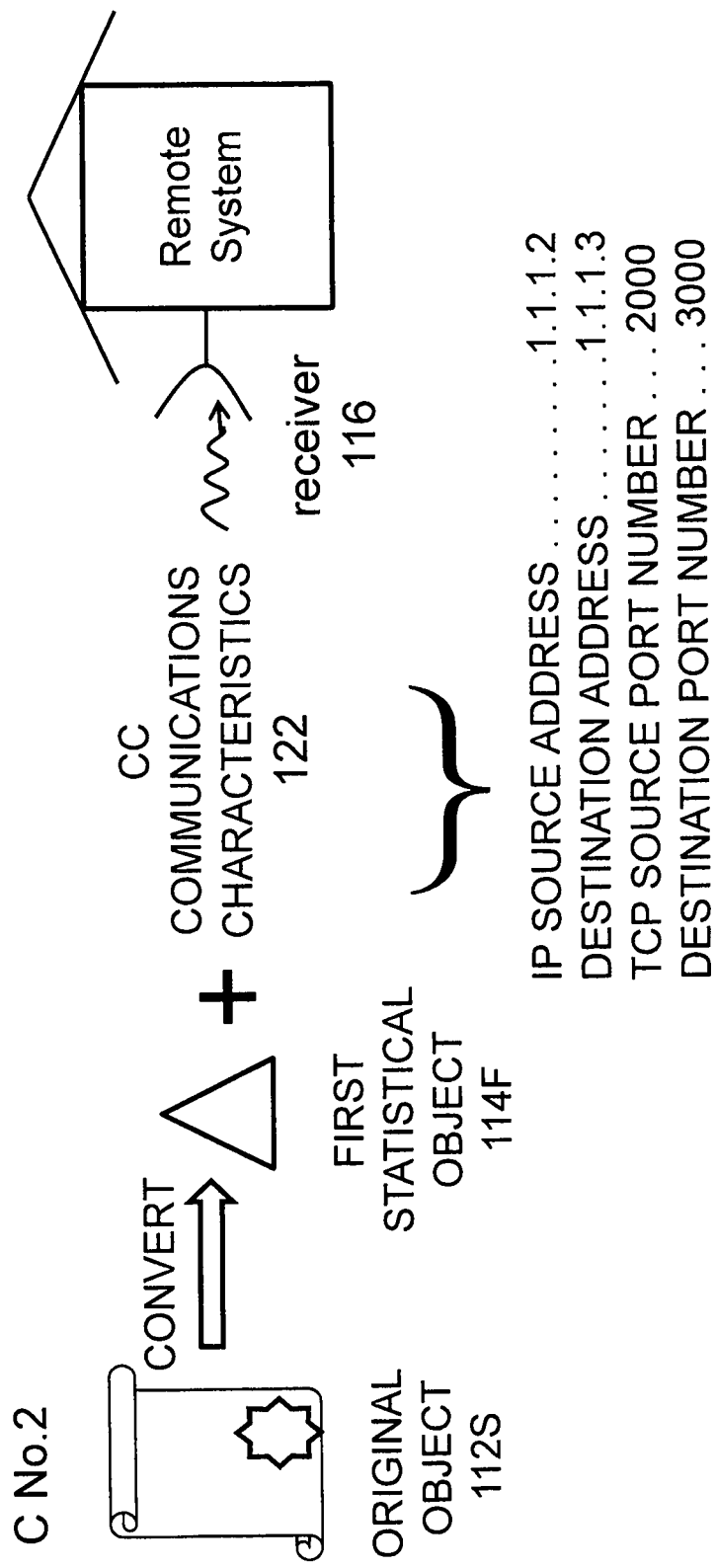

FIG. 25 furnishes a view of Ben's first communication with the remote system.

Figure 26:
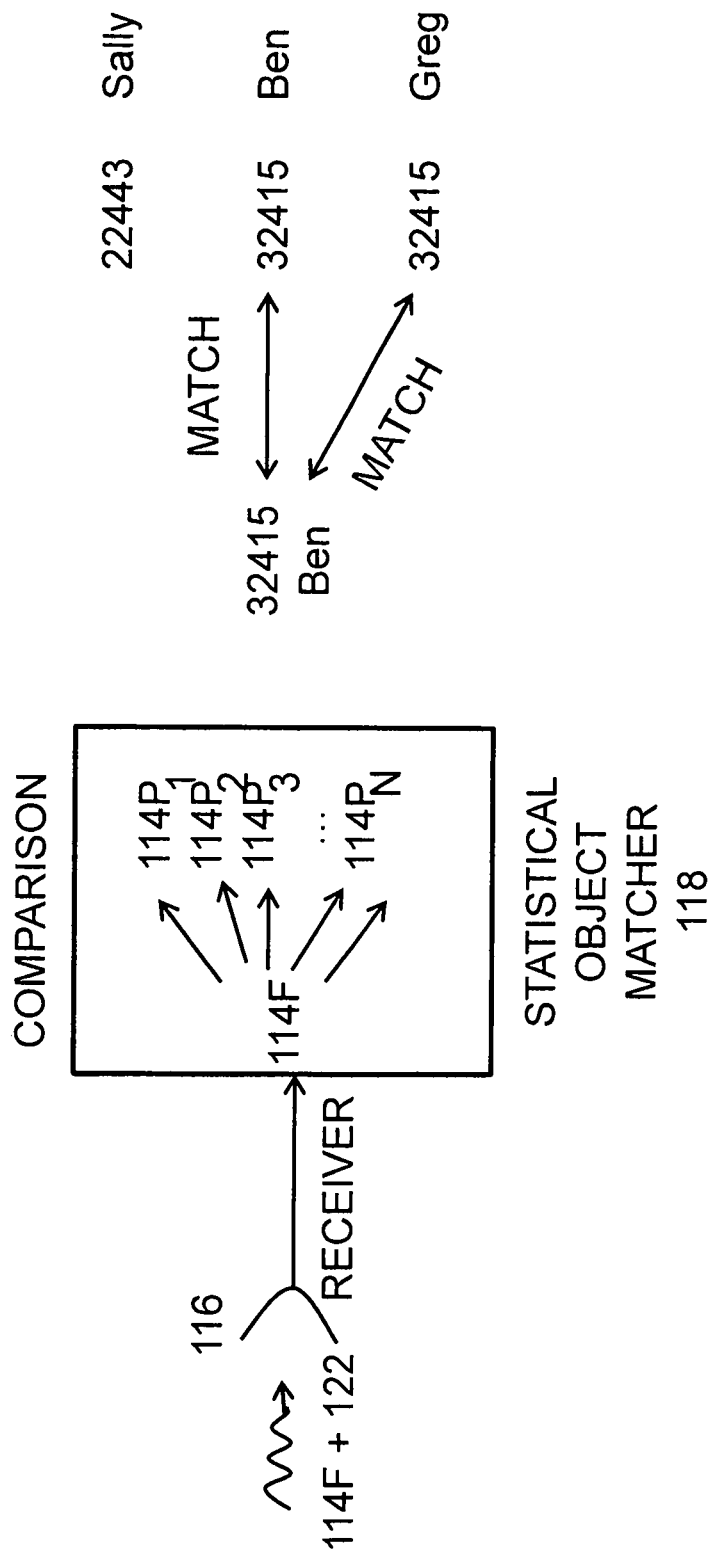

FIG. 26 depicts the comparison process that occurs within a statistical object matcher.

Figure 27:
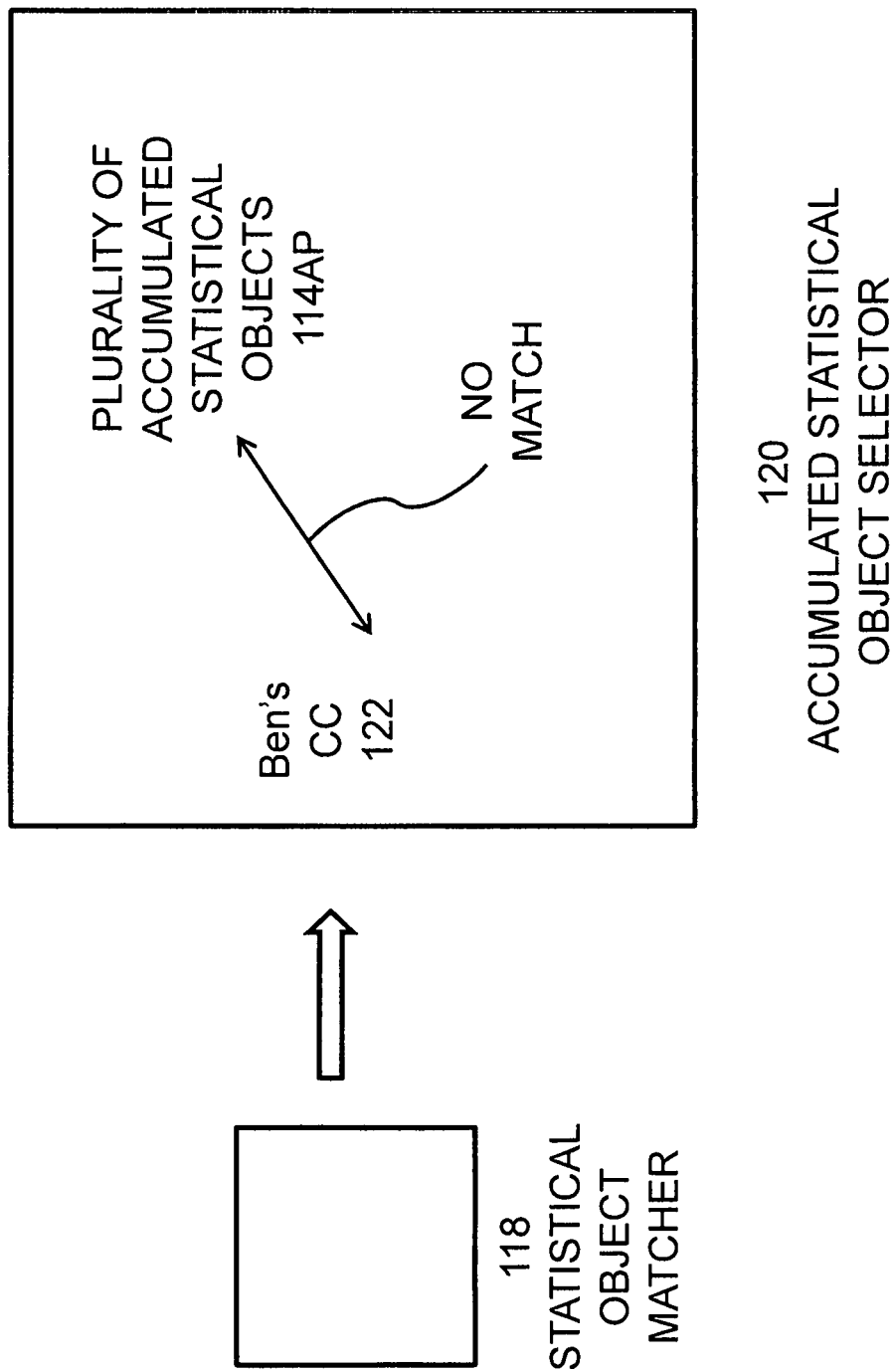

FIG. 27 illustrates the role of an accumulated statistical object selector.

Figure 28:
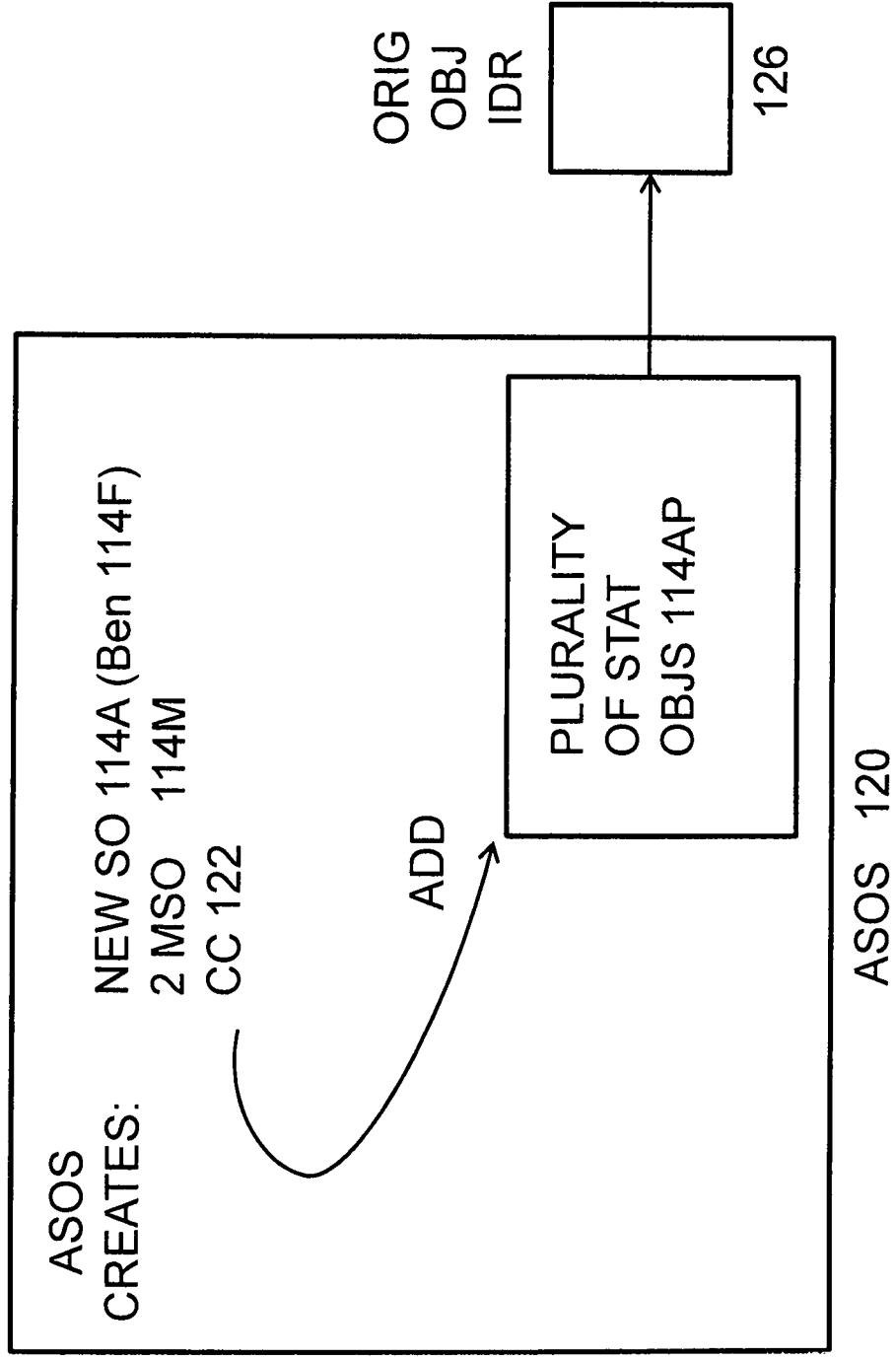

FIG. 28 illustrates the function of an accumulated statistical object selector.

Figure 29:

FIG. 29 illustrates the task of an original object identifier.

Figure 30:
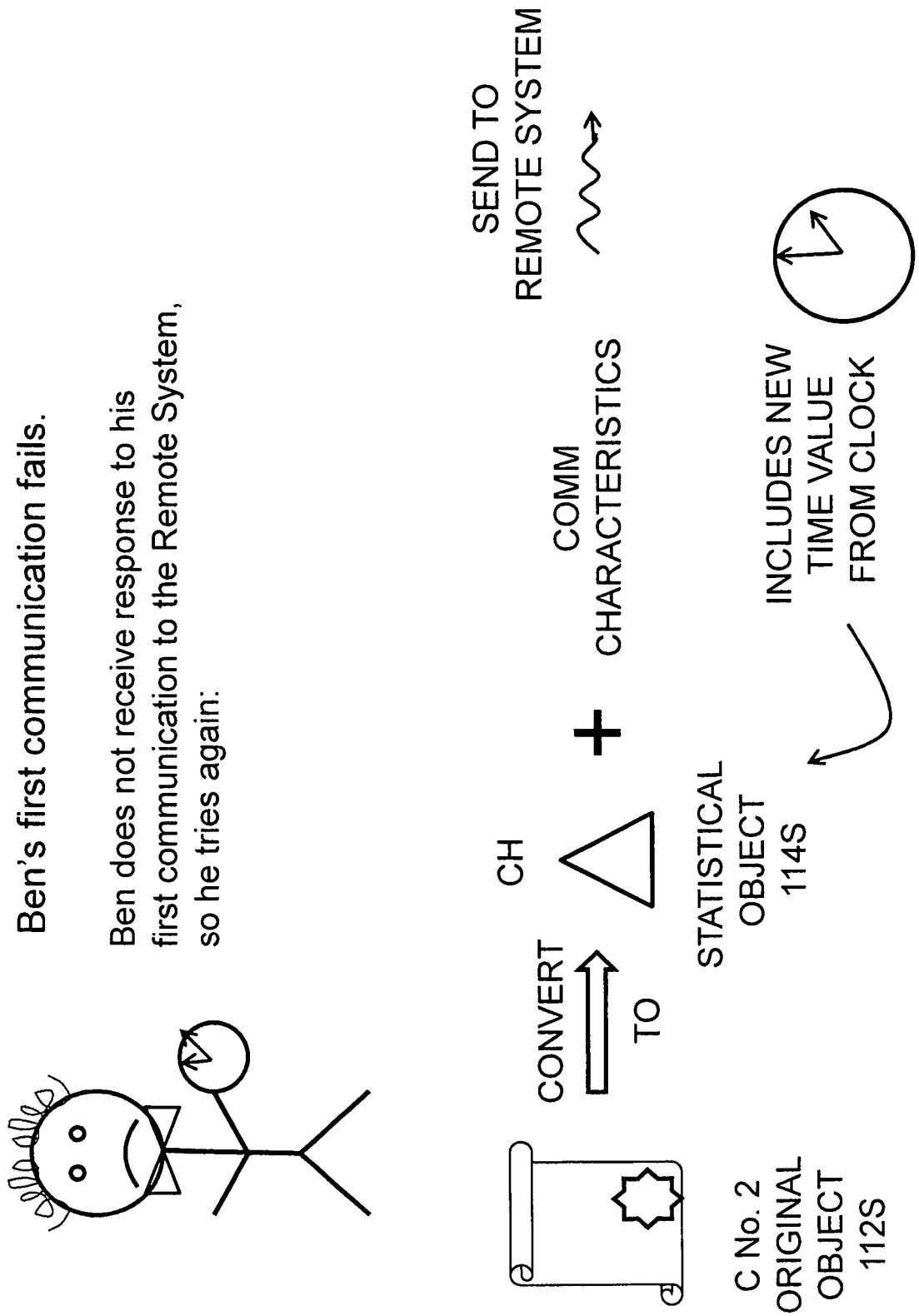

FIG. 30 shows that Ben's first communication has failed to be authenticated.

Figure 31:
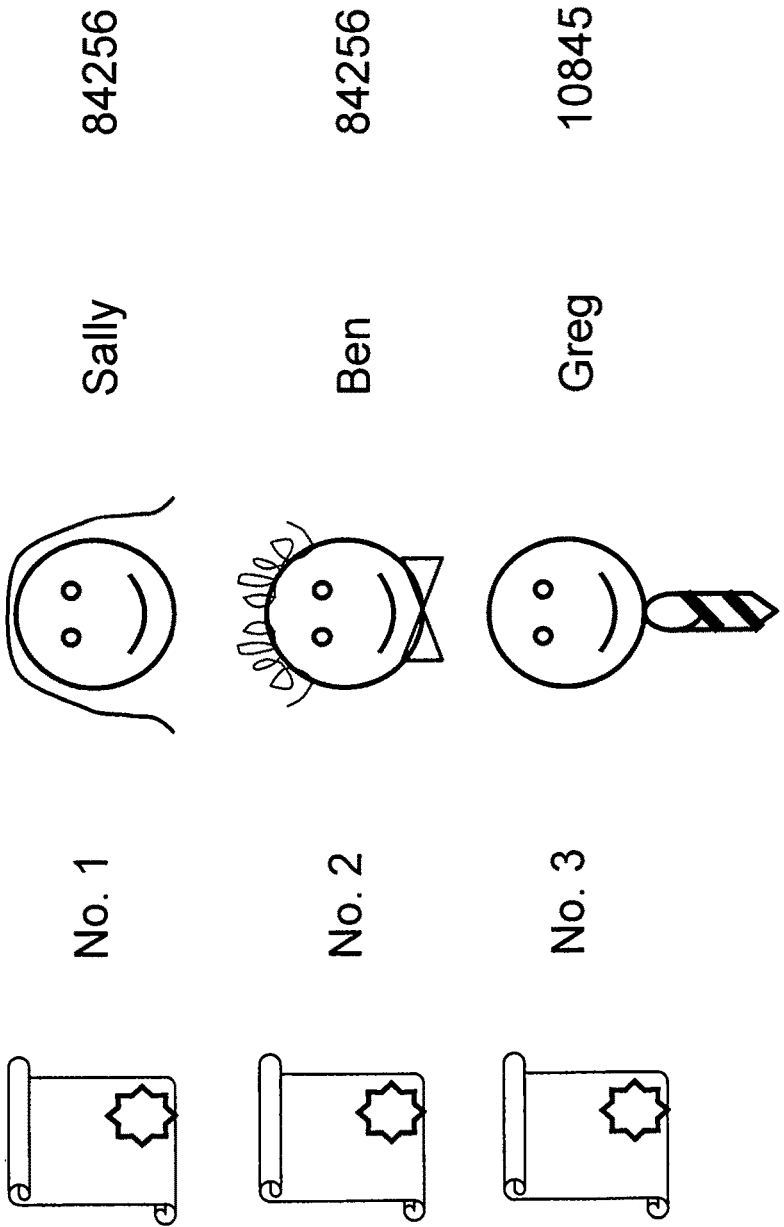

FIG. 31 supplies a schematic view of Ben's second attempt to communicate with the remote system.

Figure 32:
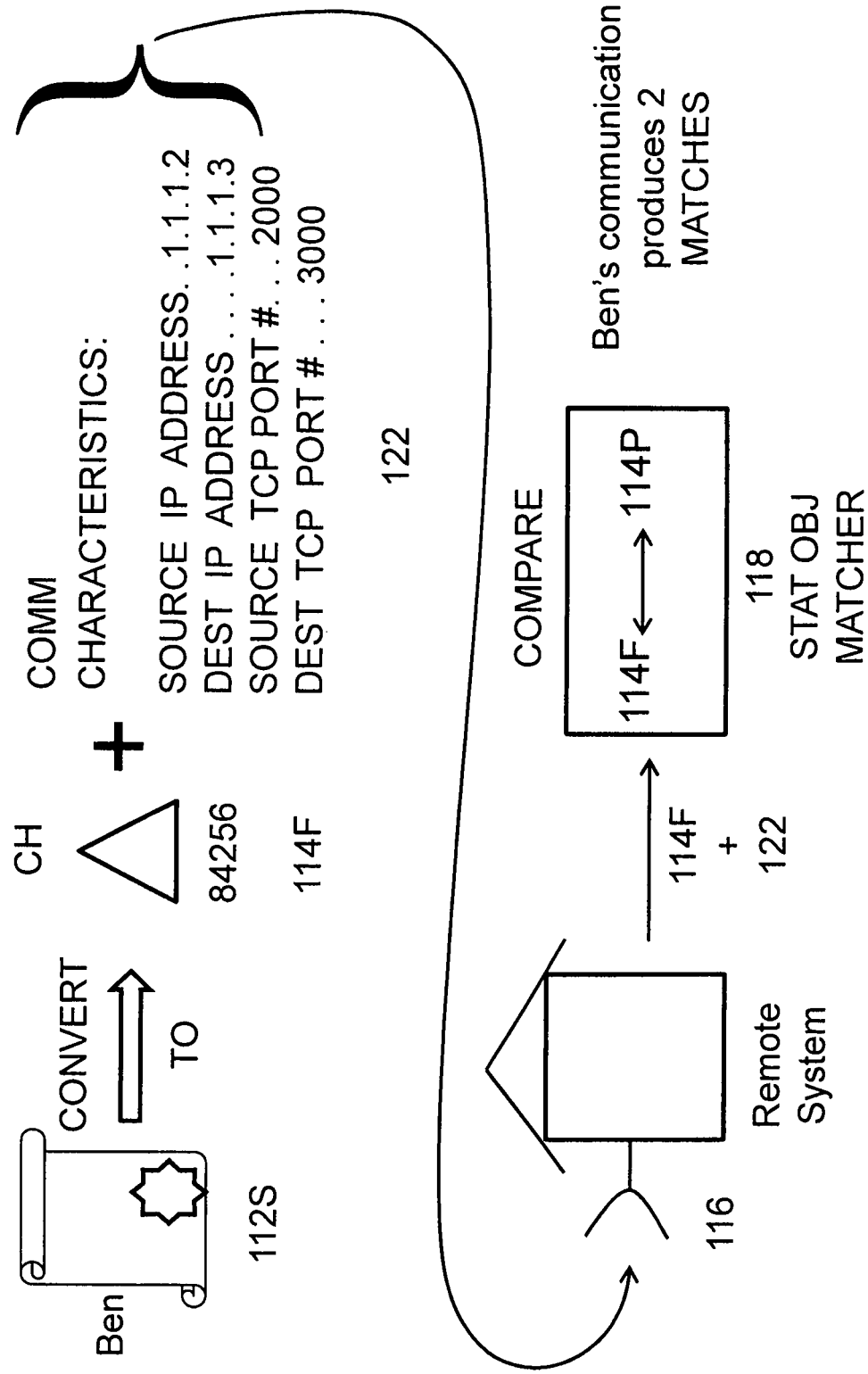

FIG. 32 depicts the second communication, and the resulting match that is produced in the statistical object matcher.

Figure 33:
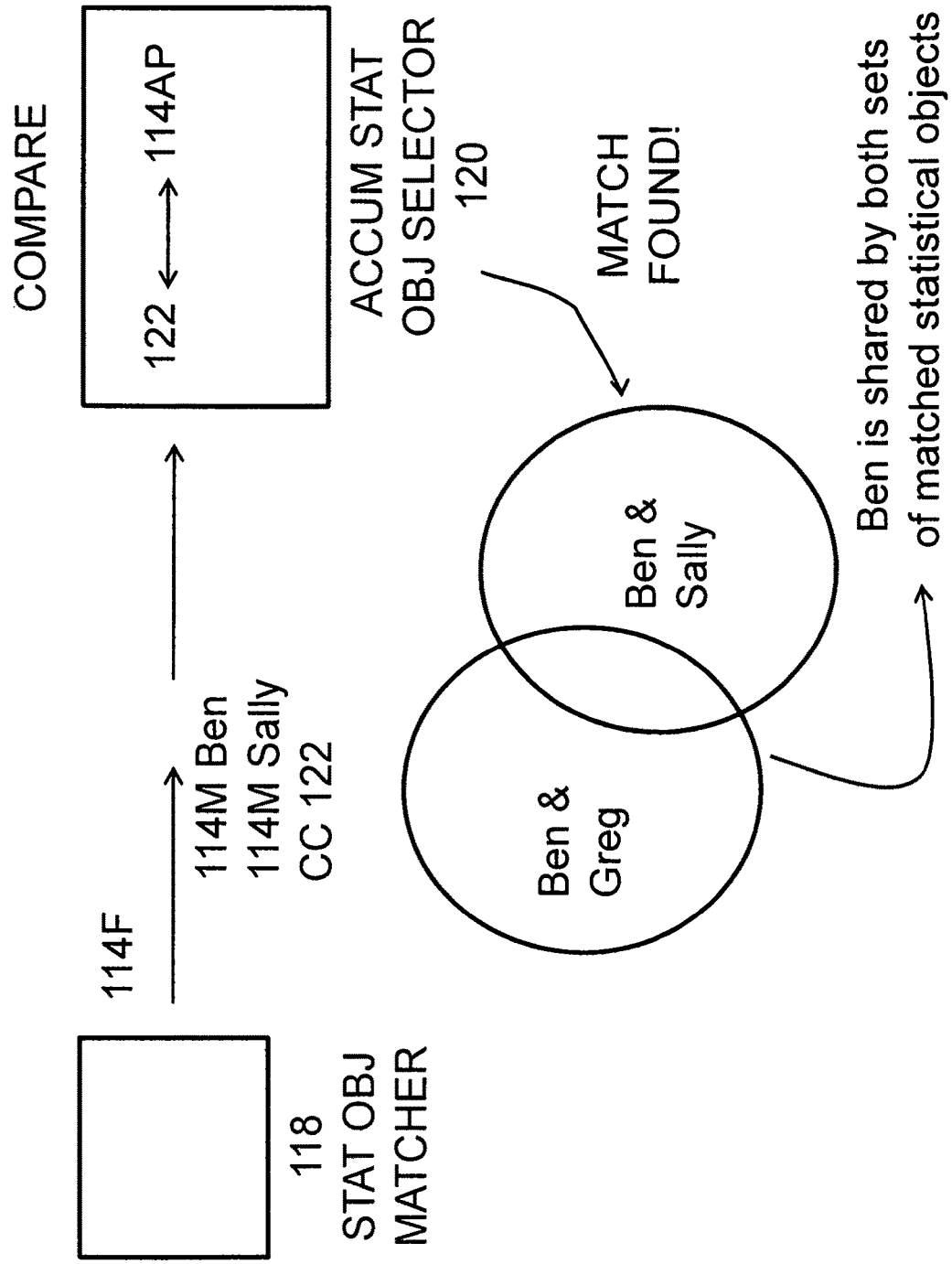

FIG. 33 illustrates the process of finding a match.

Figure 34:
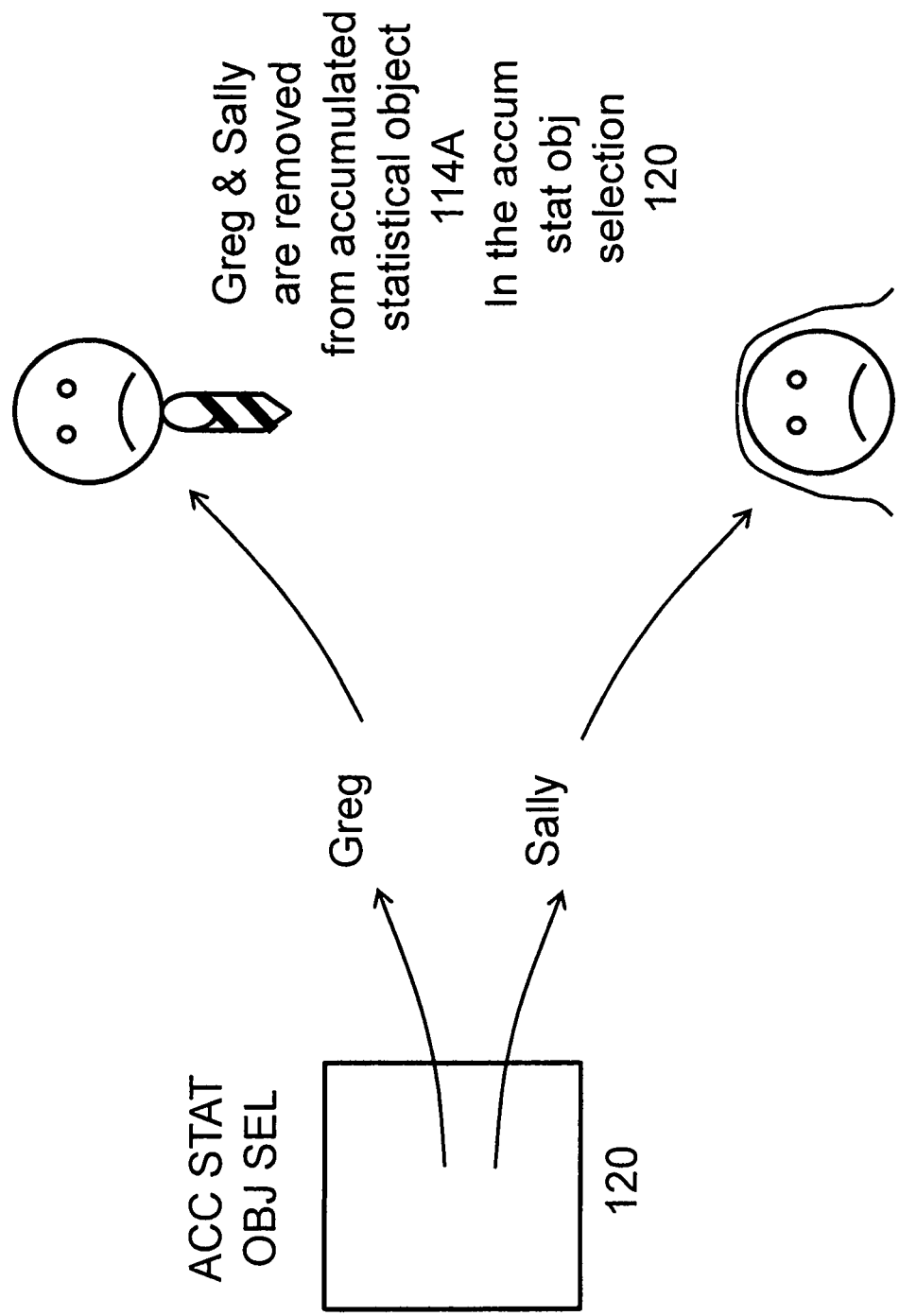

FIG. 34 shows how the accumulated statistical object selector discards statistical objects that do not lead to an authenticating match.

Figure 35:
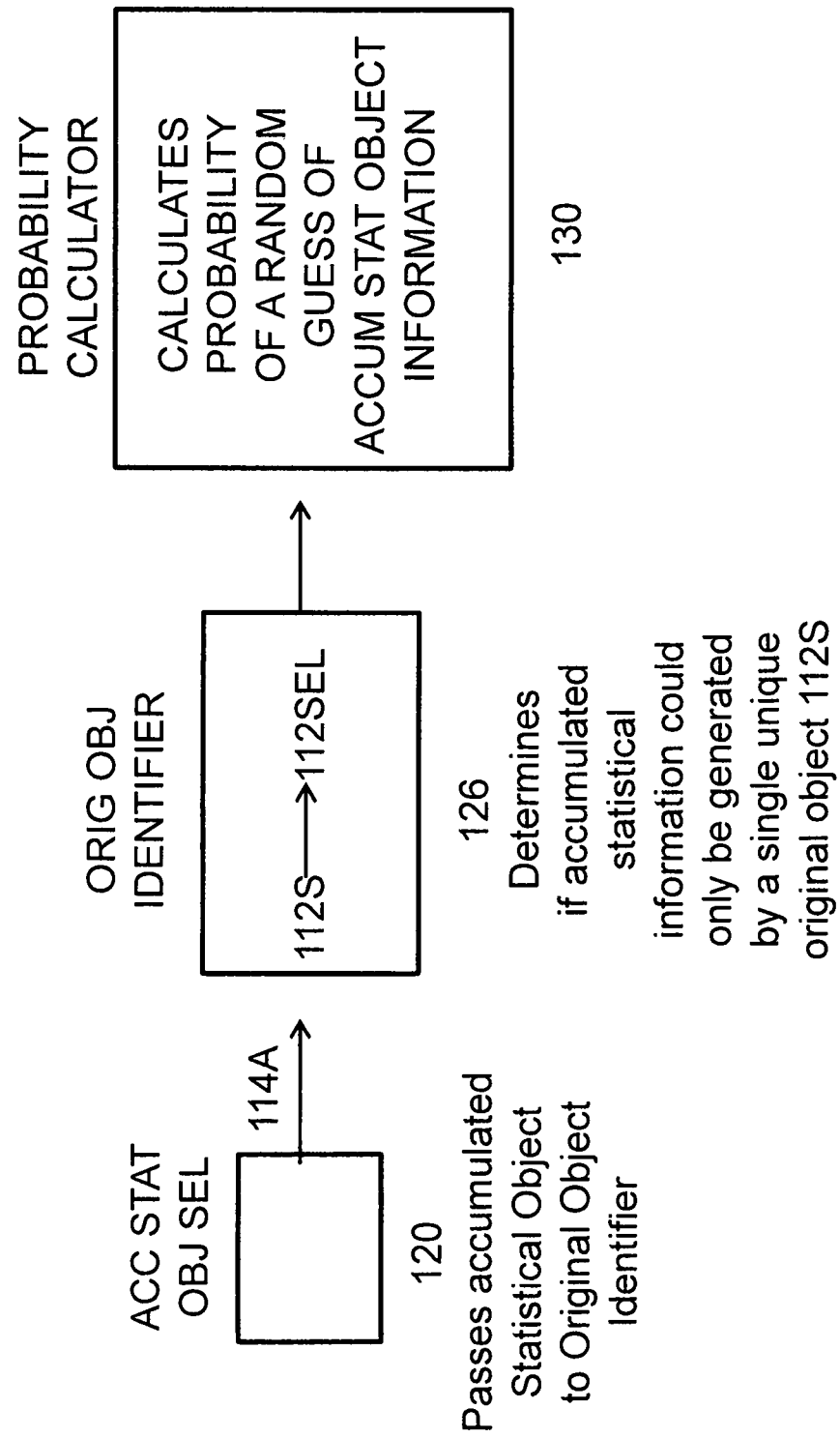

FIG. 35 furnishes a view of a probability calculator, which computes the probability of a successful guess of accumulated statistical object information.

Figure 36:
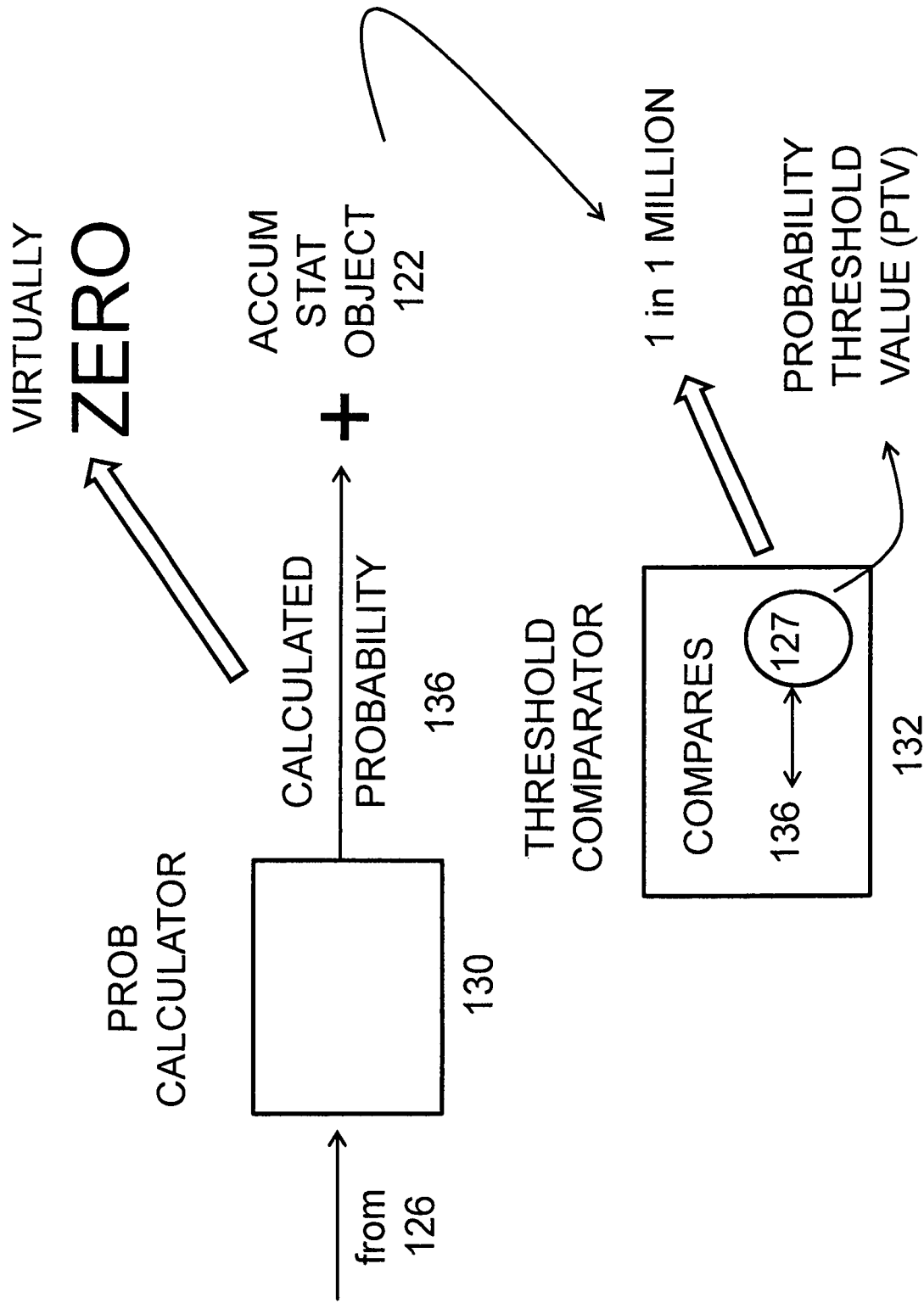

FIG. 36 reveals the function of a threshold comparator, which compares the calculated probability to a probability threshold value.

Figure 37:
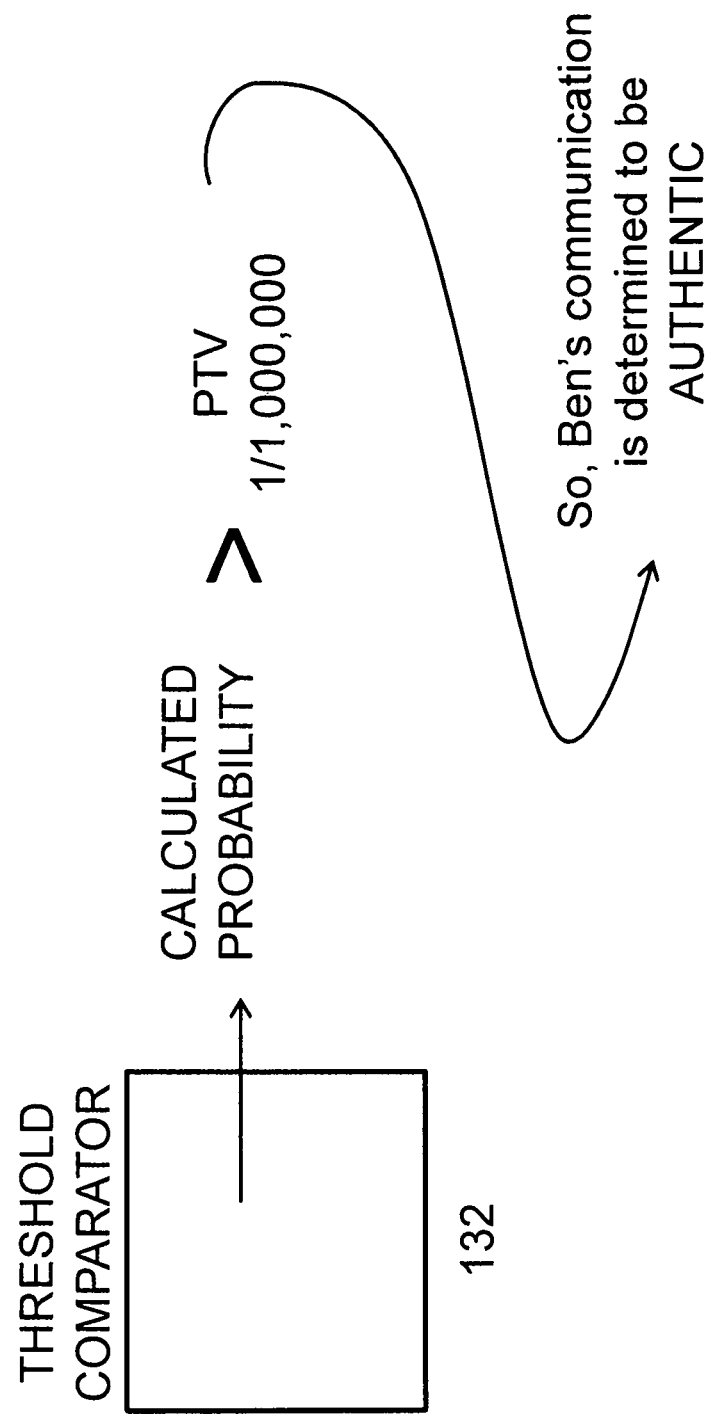

FIG. 37 exhibits the final result, the authentication of Ben's second communication.

Figure 38:
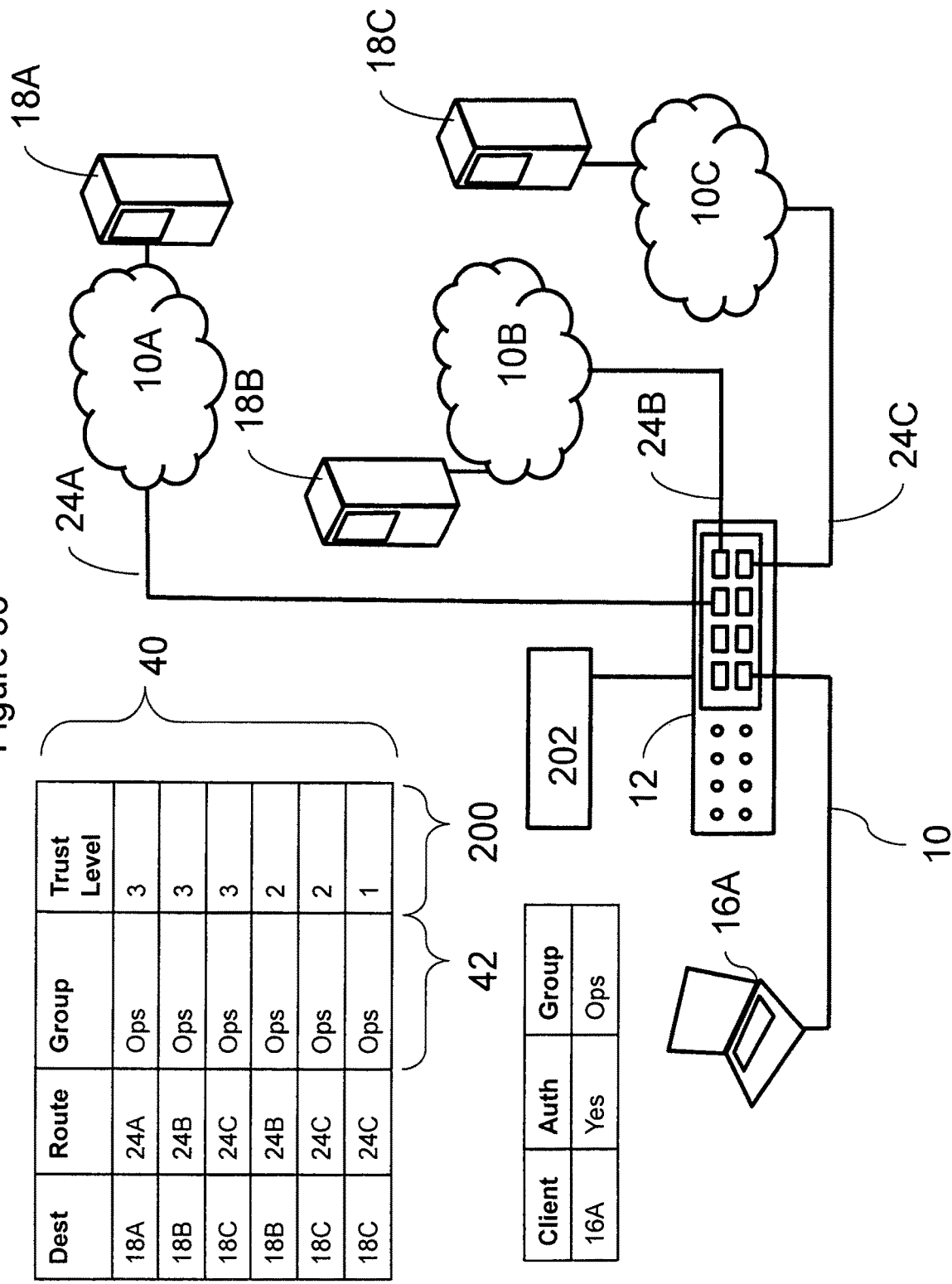

FIG. 38 is an illustration which shows one particular embodiment of the present invention.

Figure 39:
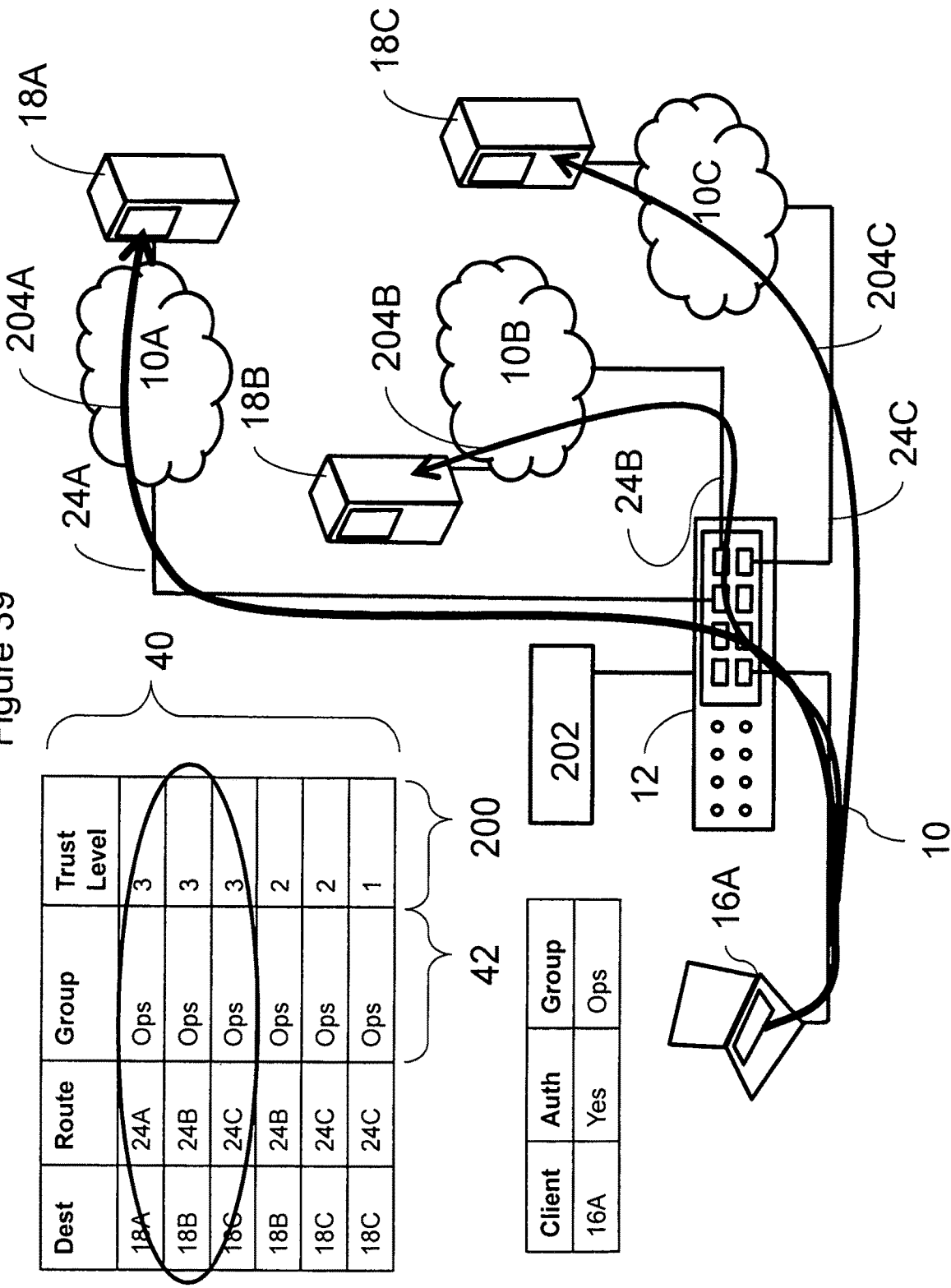

FIG. 39 highlights the route table entries for group "Ops" at trust level "3" and illustrates those routes.

Figure 40:
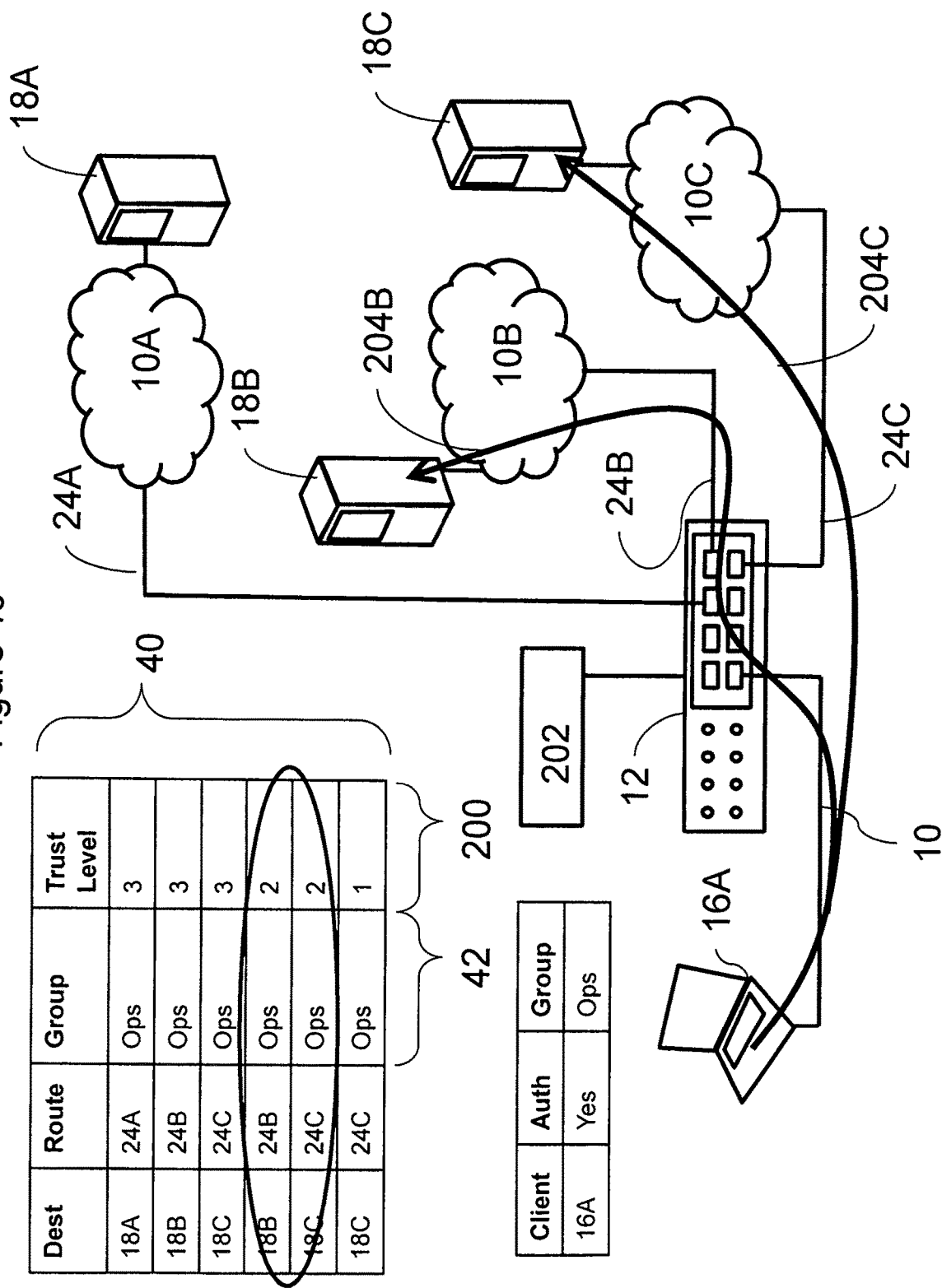

FIG. 40 highlights the route table entries for group "Ops" at trust level "2" and illustrates those routes.

Figure 41:
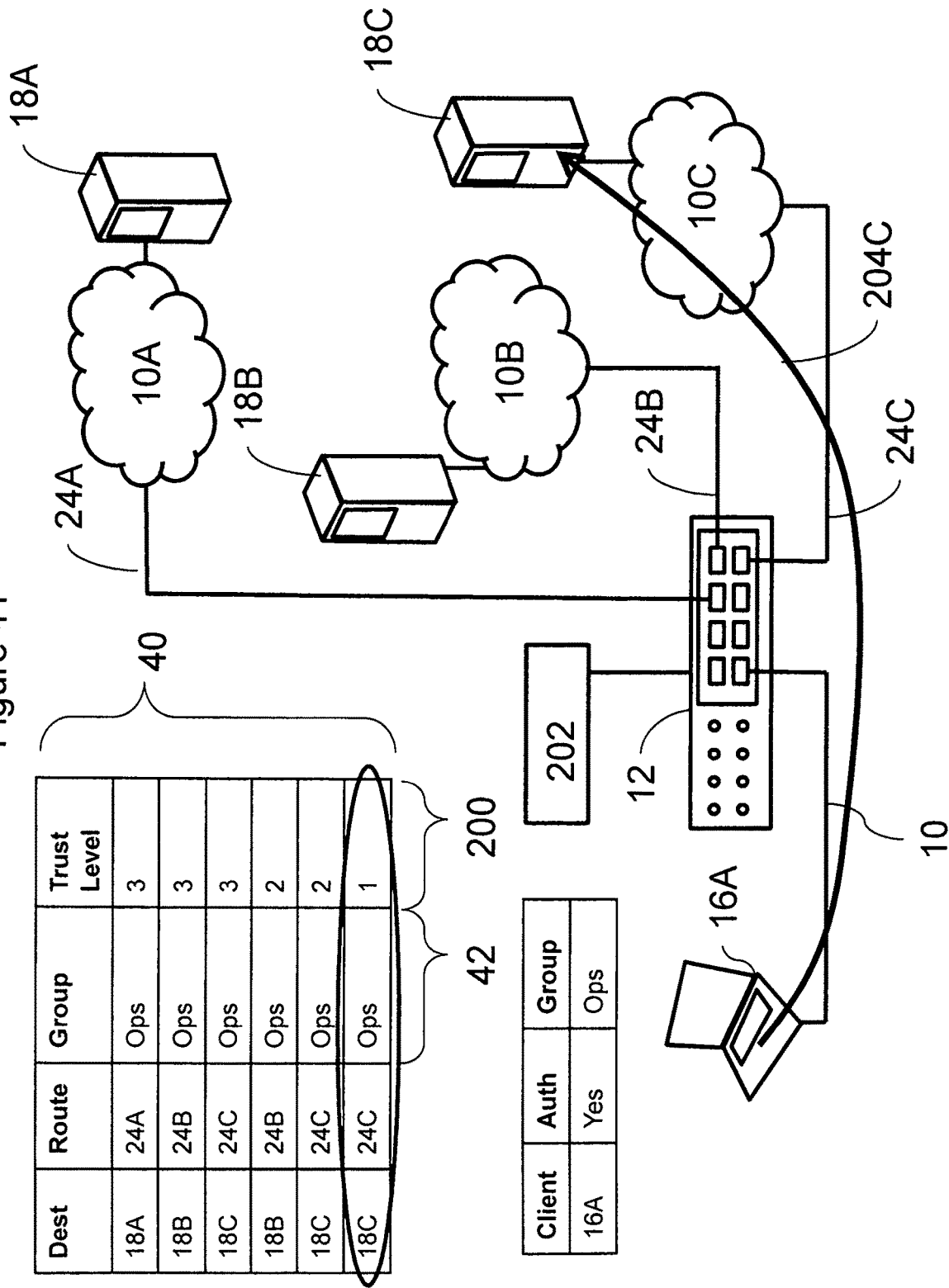

FIG. 41 highlights the route table entries for group "Ops" at trust level "1" and illustrates those routes.

Figure 42:
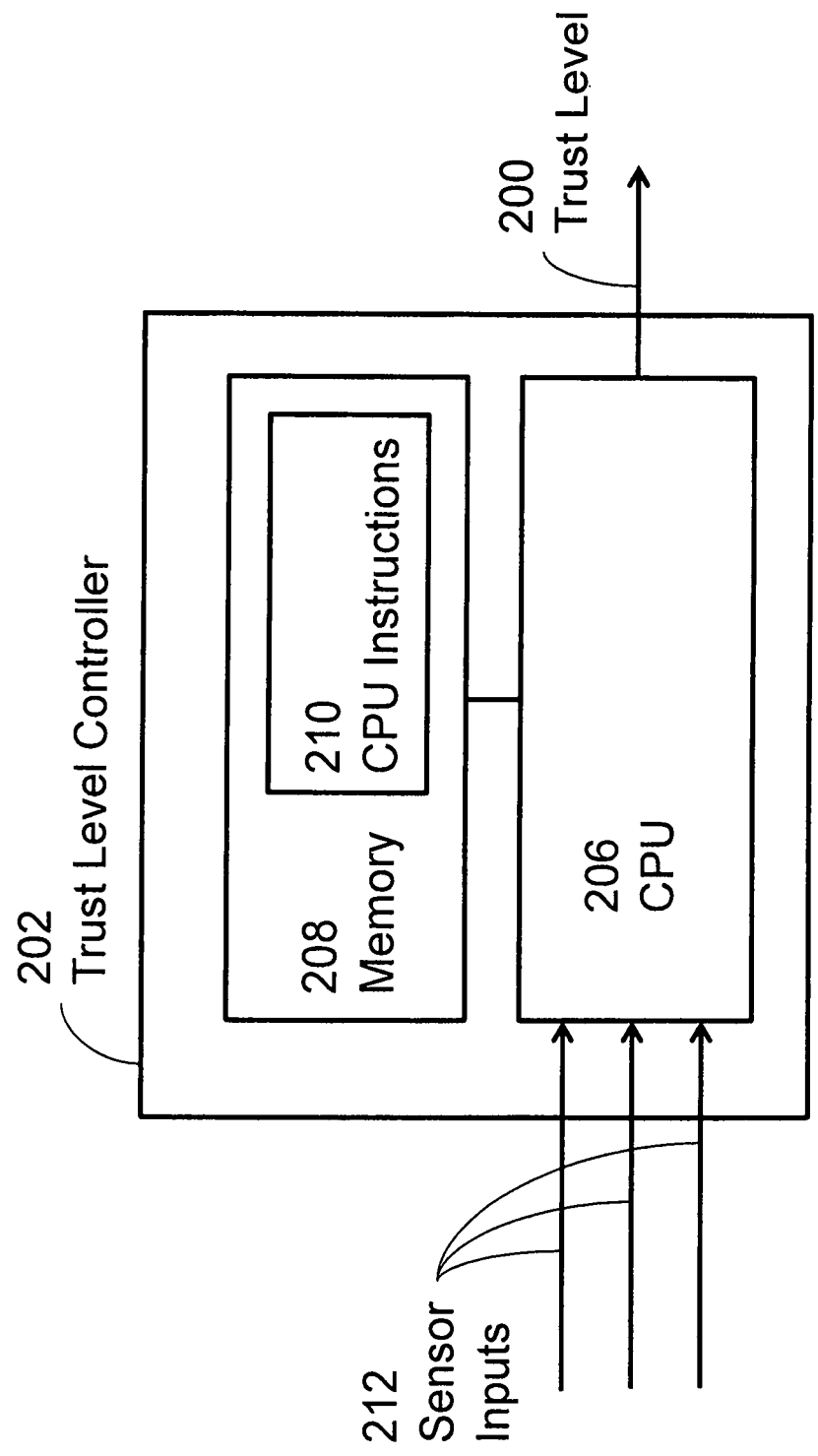

FIG. 42 is an illustration which shows details of a trust level controller.

A DETAILED DESCRIPTION OF PREFERRED & ALTERNATIVE EMBODIMENTS

I. Overview of the Invention

Conventional networks that are in use today do not use authentication as part of their packet and session processing. They rely in an implicit trust of the network and infrastructure. This lack of authentication presents an opportunity for bad actors to install and operate rogue devices and applications within an implicitly trusted network. Once installed, these rogue devices and applications can go undetected because they are implicitly trusted as an authentic device or application. With the present invention, each resource request must be authenticated before it will be processed by a trust route, making the authentication of network clients explicit before network transit services are rendered.

With the development of Transport Access Control (TAC) and TAC's ability to perform authentication on the first packet of a TCP session establishment request (TCP-SYN), authentication can be accomplished without first requiring the establishment of a TCP session. This greatly strengthens the security of a network resources protected by TAC by providing strong authentication of the requestor's identity before establishing a TCP session. TAC uses statistical objects, which are cryptographic hashes of keying material associated with an identity and various clocking material to enable expiration and uniqueness amongst statistical objects. Statistical objects are used in place of other identity certificates because they require fewer bits to communicate. This is important when using communications channels with limited bandwidth. The access policies to resources protected by TAC are based on the identity conveyed by TAC. This is the first step in providing explicit trust. The network resources beyond TAC policy enforcement points are still only implicitly trusted; there is no mechanism to provide explicit trust and authentication of those network resources. Furthermore, since network resources are passive and accept resource requests that are directed to them, there is no present mechanism to convey trust or authentication information.

II. Transport Access Control

Transport Access Control (TAC) is described in U.S. Pat. No. 8,346,951, entitled Method for First Packet Authentication. The text and drawings of U.S. Pat. No. 8,346,951 are hereby incorporated by reference.

TAC provides a mechanism to camouflage a network connected device from being detected on the network in much the same way that piece of artwork hung on a wall can camouflage a safe or compartment behind it. Camouflage works by allowing something to be hidden or by blending in with its surroundings. If a camouflaged object moves, or the object it is hiding behind moves, the camouflaged object may reveal itself. If the artwork is moved, it reveals a camouflaged or concealed safe. Once the presence of the safe is revealed, the combination of the safe may be worked to gain access to its contents. A network connected device reveals itself on the network by responding to requests. If it is desired to have the network connected device conceal itself until a authorized request is received, then a mechanism to authorize a received request is required.

TAC enables a network connected device to authorize a received TCP connection request without relying solely on a initiator's IP address. If the authorization is successful, then the connection establishment process is continued. If the authorization fails, the request is "black-holed," even though there is an application associated with the TCP port in the connection request.

The authorization mechanism uses a combination of various fields in the IP and TCP headers in the TCP connection request. All of these fields have a primary function that is defined in the IP and TCP specifications. The use of existing fields to pass a authorization key is necessary because the TCP protocol specification does not provide a mechanism to pass user data on a TCP connection request. A mechanism to pass user data on a connection request exists for the ISO TP4 protocol.

Within the IP and TCP headers there are fields that have strictly defined meanings that do not allow any additional encoding because this would alter the functionality of the IP and/or TCP protocols. Examples of such fields are the Source Address, Destination Address, Checksum, Source Port and Destination Port fields.

Within the TCP header, on a connection request (TCP-SYN), the Sequence Number (SEQ) field specifies the starting sequence number for which subsequent data octets are numbered. Additional TCP specifications recommend that this number be randomly generated. This field is 32 bits long. Also within the TCP header is the Acknowledgment Number (ACK) field. This field is not used on a TCP-SYN. This field is 32 bits long and is adjacent to the SEQ field. This gives us 64 bits of data to use as a authorizing key. A smaller key of less than 64 bits may be used if desired. It is also be possible to increase the size of the authorization key over 64 bits by using the TCP window field, the TCP urgent pointer field or other TCP fields that do not effect the connection setup procedure.

The initiator generates an authorization key. The initiator then sends a TCP connection request, inserting an authorization key in the SEQ and ACK fields, to the desired network connected device. The receiving device, upon receiving the connection request, extracts the authorization key. The receiving device then processes the authorization key to determine if the TCP connection request is authorized. During the act of processing the authorization key, the receiving device may also use the initiator's IP address, the time of day or date that the request was received, the physical port the request was received on, or any other information, implicitly or explicitly carried with the TCP connection request to determine the validity of the connection request. If the connection request, the extracted authorization key and all connection establishment granting criteria are met, then the receiving network device authorizes the request and continues the connection establishment transaction by sending a TCP-SYN/ACK in accordance to the TCP protocol specification. If the connection request, the extracted authorization key and all additional connection establishment authorization criteria are not met, then the receiving network device discards the request and nothing is sent to the connection initiator.

TAC provides methods for concealing the existence of a device connected to a computer network or concealing the existence of certain applications running on a device connected to a computer network. This concealment works by authorizing a TCP connection request using an authorization key embedded within the TCP connection request.

III. Overview of Statistical Object Identification

Statistical Object Identification (SOI) is described and claimed in U.S. Pat. No. 8,572,697, entitled Method for Statistical Object Identification. The text and drawings of U.S. Pat. No. 8,572,697 are hereby incorporated by reference.

A statistical object, the deterministic statistical representation of an original object, may be generally considered to be the output of a hash or similar function coupled with additional inputs of clocks, counters and other varying deterministic inputs. Unambiguously identifying a statistical object to a unique original object is essentially an exercise in mitigating the effects of the birthday problem. The birthday problem is the probability that output of the hash of different original objects and their deterministic inputs produce identical statistical objects. The generation of a single statistical object by two or more original objects causes a collision. Given a uniform distribution, the probability of a collision increases with the number of statistical objects in use. Statistical objects are designed to be used as components of security devices. As a component to security devices, in additional to uniquely identifying a statistical object back to the original object, the overall probability of guessing any valid statistical object must also be considered. The amount of space available to carry a statistical object will vary with the communications mechanism, but the size of an individual statistical object is expected to remain small, generally less than the number of bits required to uniquely identify an original object when large numbers of objects are in use. This requires the aggregation of two or more related statistical objects into a larger aggregate statistical object. Aggregating multiple related statistical objects into a single aggregate statistical object requires that all possible original object resolution matches are tracked and maintained. Multiple statistical objects from the same original object can be associated together by using information associated with the communication and reception of the statistical objects. This information, called communications characteristics, can include networking information, such as the source address or network session information including source and destination addresses and source and destination port numbers. Communications characteristics can also include physical information such as the physical port upon which the statistical object was received or the logical channel upon which the statistical object was received.

To unambiguously identify the original object from which a statistical object or a stream of statistical objects was generated, the device performing the identity must maintain a table of all valid statistical objects. This table may contain collisions where multiple original objects generate the same statistical object. When a statistical object is received, it is first looked up in the table of all statistical objects to determine if the received statistical object is valid. If the received statistical object is not found in the table, then no further processing occurs with respect to identifying the original object on that reception. When a statistical object is received and is matched in the table of all valid statistical objects, the communications characteristics associated with the reception of the statistical object and the list of all potential original objects are recorded. If the list of potential original objects has exactly a single entry, then the original object is identified and the process moves on to calculating the statistical probability.

When a statistical object is received and is not unambiguously identified, the partially identified statistical object and the list of potential original objects are recorded along with the communications characteristics associated with the reception of the statistical object. When a another statistical object with related communications characteristics is received, the list of potential original objects is pruned of original objects that cannot generate the complete set of received statistical objects found in the aggregate statistical object. Once the original object is unambiguously identified, the process moves on to calculating the statistical probability of guessing the information in the aggregate statistical object. If the original object is not unambiguously identified, nothing further is done at this time and the system awaits the reception of another statistical object with related communications characteristics to increase the number of bits of information received and again aggregates this information into the aggregate statistical object and the process repeats itself.

Calculating the probability of guessing the information in the aggregate statistical object requires the number of bits of statistical objects that have been received and aggregated and the number of statistical objects maintained in the table of all valid statistical objects. The specific probability p of a collision is $$p(n; d) = \frac{d!}{d^n(d-n)!}$$

where n is the number of statistical objects in the table of valid statistical objects and d is the total number of unique statistical objects available. For general use, the approximation $p(n;d) \approx 1 - e^{-n^2/(2 \times d)}$ is used. The total number of unique statistical objects available d is $d=2^b$ where b is the number of bits of statistical object information received.

Once the probability has been calculated, it is compared against the probability threshold. If the calculated probability is less than the probability threshold, then the statistical object has been identified with a confidence that the aggregate information received does not exceed the probability threshold set beforehand. If the probability-exceed the threshold, nothing further is done and the system awaits the reception of another statistical object with related communications characteristics to increase the number of bits of information received and aggregates into the aggregate statistical object and the progress repeats itself.

A further optimization can be made by associating communications characteristics across multiple identifications of statistical objects. When a statistical object is identified and does not exceed the probability threshold, thereby confirming that it was generated from the original object, the communications characteristics are temporarily associated with that original object. When a subsequent statistical object with similar or identical communications characteristics is received, the received statistical object is checked against the associated original object. If the associated original object could produce the received statistical object, the statistical object is identified as being produced by the associated original object. When multiple original objects are associated with the same set of communications characteristics, the identification of the statistical object proceeds by aggregating the statistical object information and pruning the list of potential original objects until only a single original object remains. The statistical object is still aggregated in an aggregated statistical object to enable the aggregation of information for the probability calculation. The probability calculation is made using the number of bits of information received in the aggregate statistical object and the number of statistical objects that are associated with the communications characteristics that are associated with the original object. This results in a lesser amount of statistical object information being required to not exceed the probability threshold, because the communications criteria is being used as an additional descriminator. Multiple sets of communications characteristics can be associated original object and multiple original objects can be associated with a single set of communications characteristics. When a statistical object is identified as being produced by an original object, a timestamp or other mechanism for indicating recent activity is updated in the communications characteristics associated with the original object. The lack of communications characteristics associated with original objects after a period of time should have their association removed after such periods of inactivity exceed a threshold. Subsequent statistical object reception with those removed communications characteristics will proceed as unassociated communications until those communications are again associated with an original object.

To insure the security of the statistical objects being produced cannot be readily captured, copied and replayed as original, the algorithms used to generate the statistical objects uses additional information in addition to the original object as inputs. This additional information may include clocks, counters and other deterministic inputs. During the identification of a statistical object back to an original object, this additional information is also identified and used to further validate the identity of the original object.

The probability threshold has several unique uses. Firstly, the use of a probability threshold enables the system for statistical object identity to be used with varying numbers of statistical objects contained within the table of all valid statistical objects without having the probability of guessing a statistical object increase as statistical objects are added to the valid statistical object table. The system employed here simply requires additional statistical objects, thus increasing the amount of information available to maintain the desired probability. The second unique attribute of using the probability threshold is that the probability threshold can be changed by the entity performing statistical object identification without communication, knowledge or coordination of the change by the entity generating the statistical object. This is especially important in the context of cyber security where knowledge of a threat or attack may raise the level of security desired. This can be used by the entity receiving and performing statistical object identification to decrease the threshold, requiring more statistical information before the original object identity is confirmed. The ability to perform this function without requiring any communication or notification to the entity producing the statistical object is especially useful and novel.

Additional information can also be conveyed using statistical objects. When additional inputs are used in the generation of the statistical object, this information can be extracted during the statistical object identification process. Examples of such additional information includes, but is not limited to, information regarding the state of some system or process, an index into a table of information or other types of data.

One embodiment of SOI provides a method for authenticating a communication. Communications received by the remote system must be authenticated before they are allowed. In this Specification, and in the Claims that follow, the terms authenticate and authentication are intended to mean that the identity of a communicator or an initiator of a communication has been verified, and that a particular communication is permitted, allowed or otherwise approved to proceed into the remote system.

One limitation of current information networks is that it is difficult to verify or approve a communication before the communication has been allowed to penetrate a network. One reason for this difficulty is that the means of verification, which is called a "certificate," is too large to send to the network in the initial set of digital information which initiates the communication, and which ultimately leads to an authentication.

One embodiment of SOI solves this problem by reducing the information in the certificate which is used to authenticate the communication before it is allowed to proceed by converting the certificate to a much smaller "statistical object." The method allows the network to determine the identity of the initiator of the communication before the communication is given access to the network. This method provides a security feature that substantially eliminates potentially detrimental malicious attacks that could be perpetrated on the network using conventional technology.

IV. Definition of Terms

Analytics—A system, apparatus and/or method that takes sensor and data inputs from multiple sources to produce a coordinated view of activity. Analytics may employ "big data" and "artificial intelligence" techniques. Analytics can provide situational awareness, baseline and out of parameter behavioral indications, security anomaly detection and other multivariate analysis.

Authentication—Verifying the identity of a user, process, or device, often as a prerequisite to allowing access to resources in an information system.

Authenticating Device—A device that verifies the identity of a user, process or device.

Authentication Information—Information provided for the purpose of verifying the identity of a user, process or device.

Authentication Object—An object provided for the purpose of providing authentication of the entity making a resource request or providing a network resource.

Computing Object—Any object, code, script, instruction, parameter, URL, SQL command, or transaction that can cause a change in state of the entity performing the computation.

Connection—A logical pairing of two devices that enable them to communicate. A connection utilizes a series of packets to accomplish this. A TCP connection is an example of a connection.

Connection Request—A request by one device to another device to create a connection.

Cryptographic Hash—A hash function that takes a string of any length as input and produce a fixed-length hash value. A cryptographic hash function differs from a non-cryptographic hash function in that a cryptographic hash function is able to withstand cryptoanalytic attacks.

Cryptographic Token—The output of a cryptographic hash which uses a clock as one of the inputs to the hash function.

Device—A device is any object that is capable of being attached or wirelessly connected to and communicating on a network. Examples of devices include computers, servers, clients, laptops, PDAs, cell phones, smart phones, network appliances, storage systems, virtual appliances, switches, routers, load balancers, caches, intrusion detection systems, VPNs, authentication devices, intrusion prevention systems, and firewalls.

Digital Identity—A digital representation of a set of characteristics by which a user, process or device is uniquely recognized.

Hash or Hashing function—Any procedure or mathematical method that converts are large amount of data into a smaller amount of data. In one embodiment of the invention, the output may be a single integer or value which serves as an index to an array or database.

Honey Pot—A trap set to detect, deflect, or in some manner counteract attempts at unauthorized use of information systems.

Hypervisor—A virtualization technique that allows multiple operating systems, termed guests, to run concurrently on a host computer. It is so named because it is conceptually one level higher than a supervisory program.

IP—IP is the Internet Protocol. The Internet Protocol is a data oriented protocol used by devices to communicate across a packet switched network. IP information is carried by an IP header in an IP packet. The IP header contains device address information, and protocol control information.

Management Entity—A network device that can provide one or more of the following services: monitoring, configuration, reporting, log and record aggregation services, responding to indications and events.

Network—A network is a collection of computers, servers, clients, routers and devices that are connected together such that they can communicate with each other. The Internet is an example of a network.

Network Client—A network device that actively sends a request to another entity with the expectation that the request will be fulfilled.

Network Load Balancer—A network device that directs network traffic to different network resources to provide system scalability and redundancy.

Network Request—A request for service provided by a network resource. At the TCP layer, a network request is a request to establish a TCP session, commonly known as a TCP SYN.

Network Resource—A network device that provides data or services in response to a received resource request.

Original Object—The inputs to the function that generates a statistical object. The original object can include additional inputs such as clocks, counters, nonces and other deterministic information.

Protocol—In the field of telecommunications, a protocol is the set of standard rules for data representation, signaling, authentication, error detection and other features required to send information over a communications channel. Not all protocols provide all of these features. Protocols with different features may be layered on top of one another to provide a more robust feature set. Examples of protocols are the IP protocol and the TCP protocol. These protocols are often used together and referred to as the TCP/IP protocol.

Protocol Entity—A device, function, process or procedure that implements a communications protocol.

Quarantine Resource—A network resource designed to contain an unauthenticated, unidentified or unauthorized computing object. The quarantined computing object can be a network resource request, a protocol transaction, transmitted code or any other computing object.

Remediation Server—A network resource that provides system updates or other computing health components. A request may be send to a remediation server to update the requesting client before the requesting client is allows access to other network resources.

Resource—In computing, a resource is data or services provided by a computing entity. Resources may be primitives such as memory, storage or raw network access, or resources may be more abstract objects such as a remote file, a webpage or the use of a display, printer or other input/output device.

Resource Request—A resource request is a description of storing, retrieving, sending, receiving, processing or manipulation of a computing resource. A resource request over a network is request for service provided by a network resource. For the TCP protocol, a resource request is a request to establish a TCP session, commonly known as a TCP-SYN.

Router—A router is a networking device that forwards data packets between computer networks. Routers perform the "traffic directing" functions on the Internet. A data packet is typically forwarded from one router to another through the networks that constitute the interne until it reaches its destination.

Route Table—A route table, also called a routing table, is a database which keeps track of paths in a network, like a map, and allows the router to send the IP packet to the next router or final destination computer.

Route—A path through a computer network.

Statistical Object—The output of a function that has a statistical distribution. Commonly, a statistical object is the output of a hashing function.

TAC—Transport Access Control. A method of embedding identity into a TCP header that allows the authentication of a TCP session request before providing a response to the requesting entity.

TCP—TCP is the Transmission Control Protocol. Using TCP, networked devices can create connections to one another, over which they can send data. The TCP protocol guarantees that data sent by one endpoint will be received in the same order by the other, and without any pieces missing. The TCP protocol also distinguishes data for different applications (such as a Web server and an email server) on the same device.

Trust Level—An indication of trustworthiness assigned to an identity.

Trust Level Controller—An entity that assigns a Trust Level to an identity. A trust level controller is often an analytics system.

Trust Router—A network device that routes network packets based on routing table information, identity information and trust level information.

Trust Policy—A policy that determines the disposition of the handling of a resource request based on the trust of the sender of the resource request. For example, authenticated and thus trusted resource requests are passed to a trusted network resource, while unauthenticated and thus untrusted resource requests are discarded.

Virtual Appliance—A virtual machine image designed to run on a virtualization platform. Virtual appliances are a subset of the broader class of software appliances.

Virtualized Network Environment—The networking infrastructure residing inside of a virtualization platform.

Virtualization Platform—The hypervisor, management system, storage and network infrastructure that provide hardware virtualization services. Common virtualization platforms include VMware, Xen, and Microsoft Virtual PC.

Virtualization System Manager—A management system that sets policy for a hypervisor. Also called a Hypervisor System Manager.

V. Preferred and Alternative Embodiments

Figure 1:
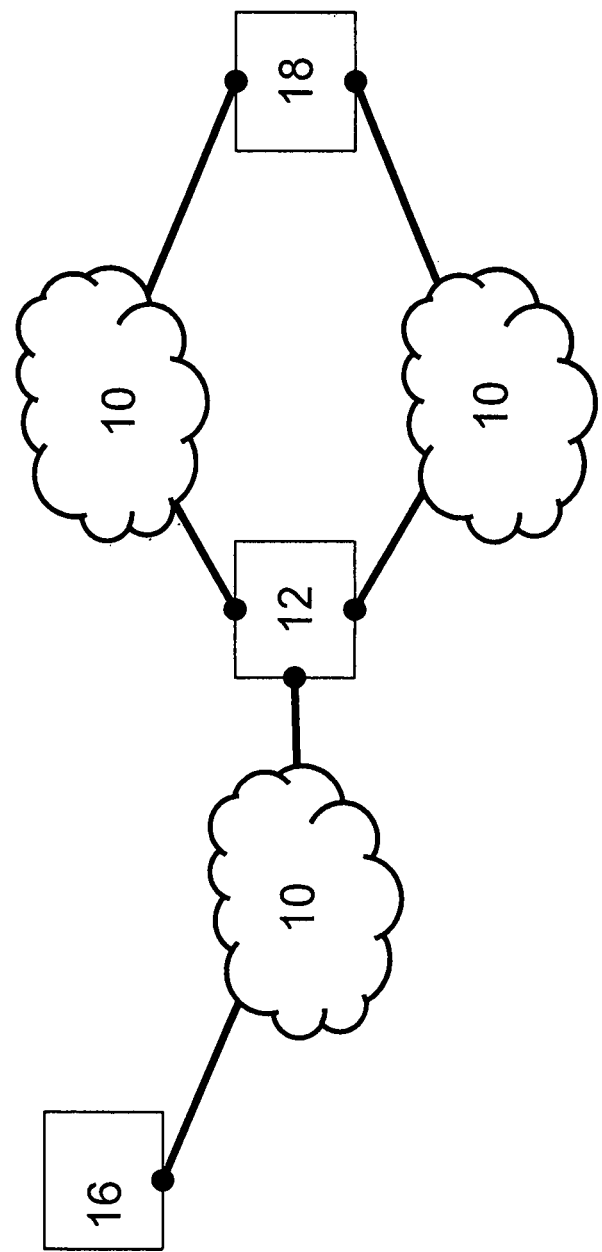
FIG. 1 shows a plurality of network routes from a trust router to a network resource.

FIG. 1 is an illustration which shows one particular embodiment of the present invention, which includes a plurality of networks 10 connected to a trust router 12. Also connected to the individual networks 10 are a network client 16 and a network resource 18.

Figure 2:
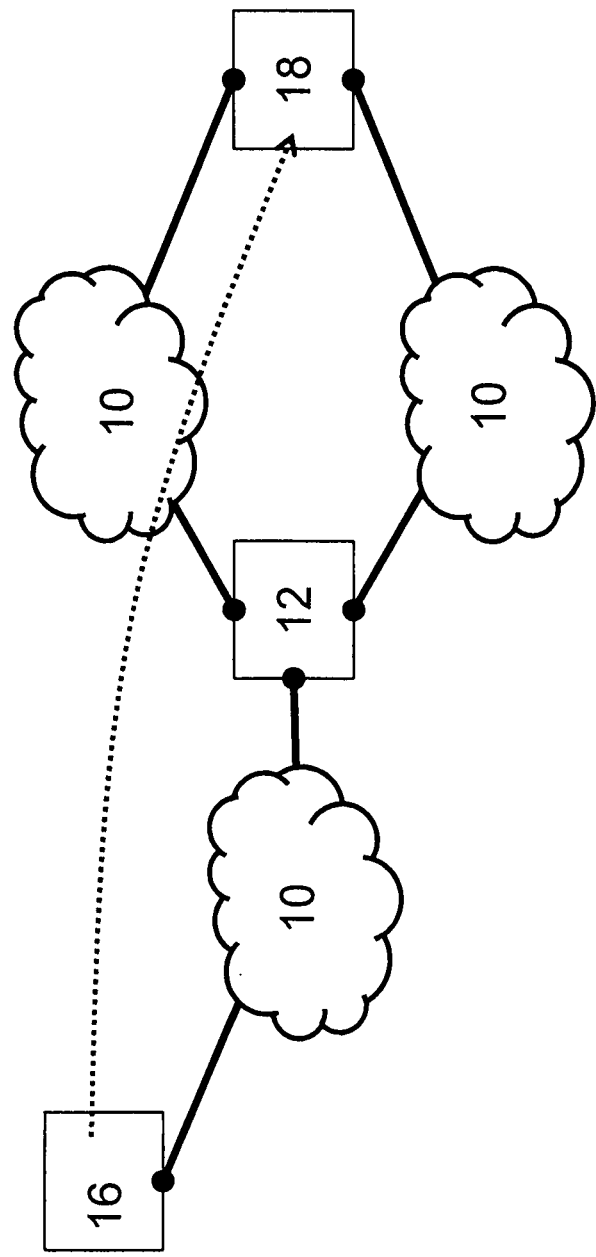
FIG. 2 shows a network client desiring to send a network request to a network resource.

FIG. 2 shows a network client 16 intending to send a resource request 20 to network resource 18.

Figure 3:
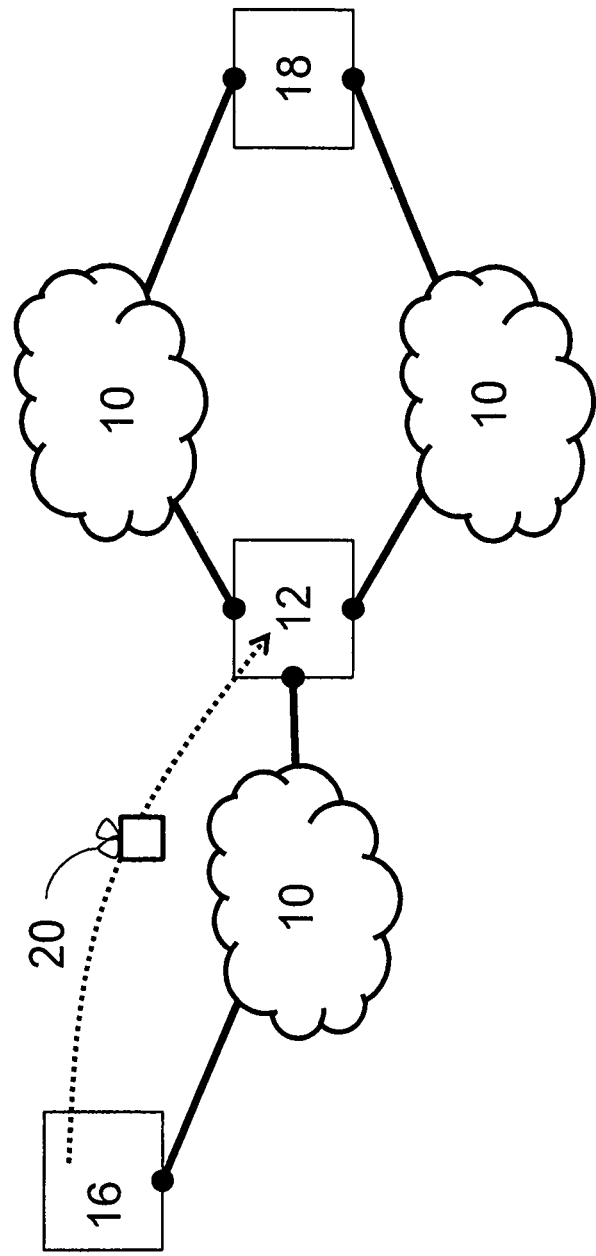
FIG. 3 shows a network client sending a resource request to a trust router.

FIG. 3 shows a network client 16 sending a resource request 20 to a trust router 12.

Figure 4:
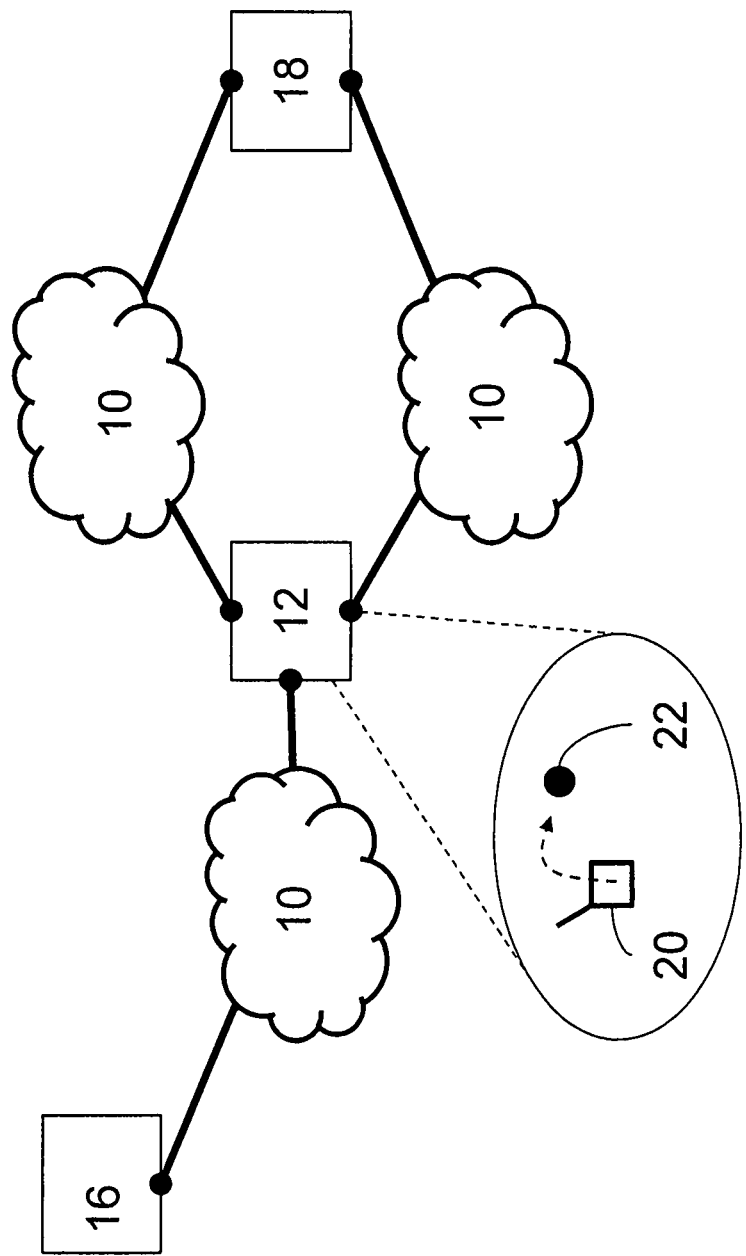
FIG. 4 shows a trust router extracting an authentication object from a resource request.

FIG. 4 shows a trust router 12 extracting an authentication object 22 from the resource request 20.

Figure 5:
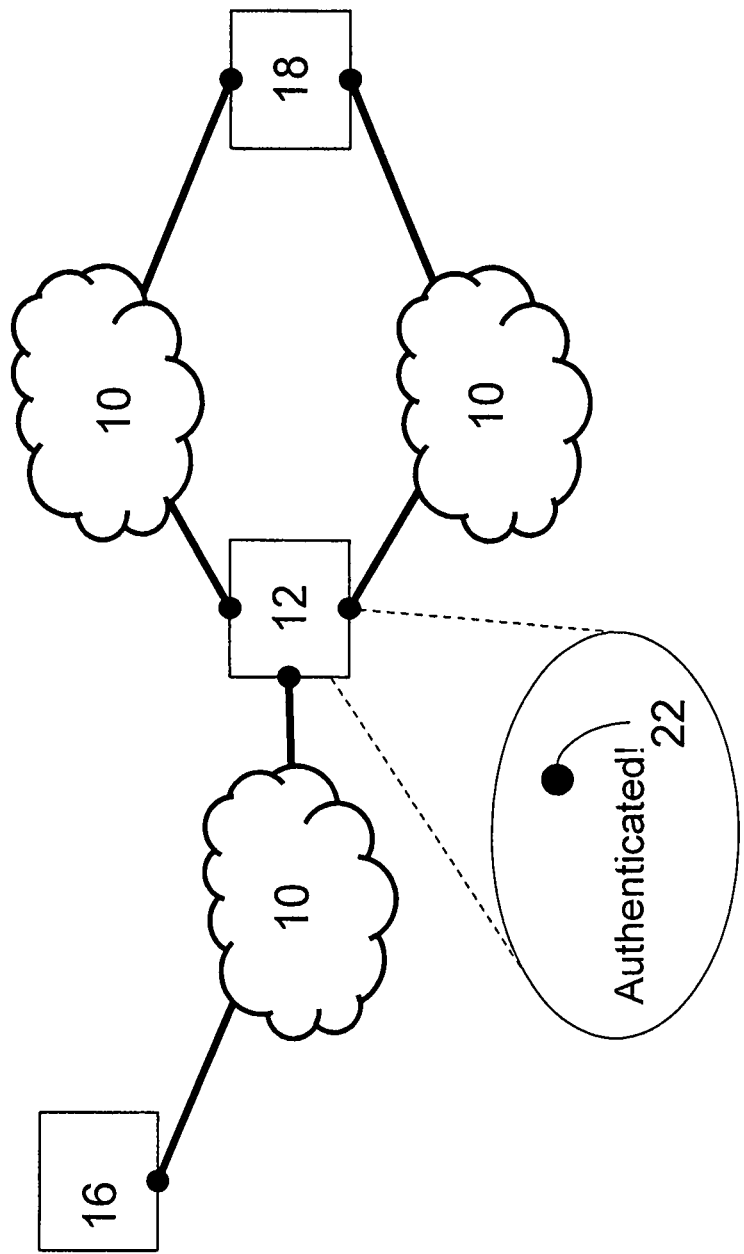
FIG. 5 shows a trust router authenticating a resource request by processing the authentication object.

FIG. 5 shows a trust router 12 authenticating the authentication object 22.

Figure 6:
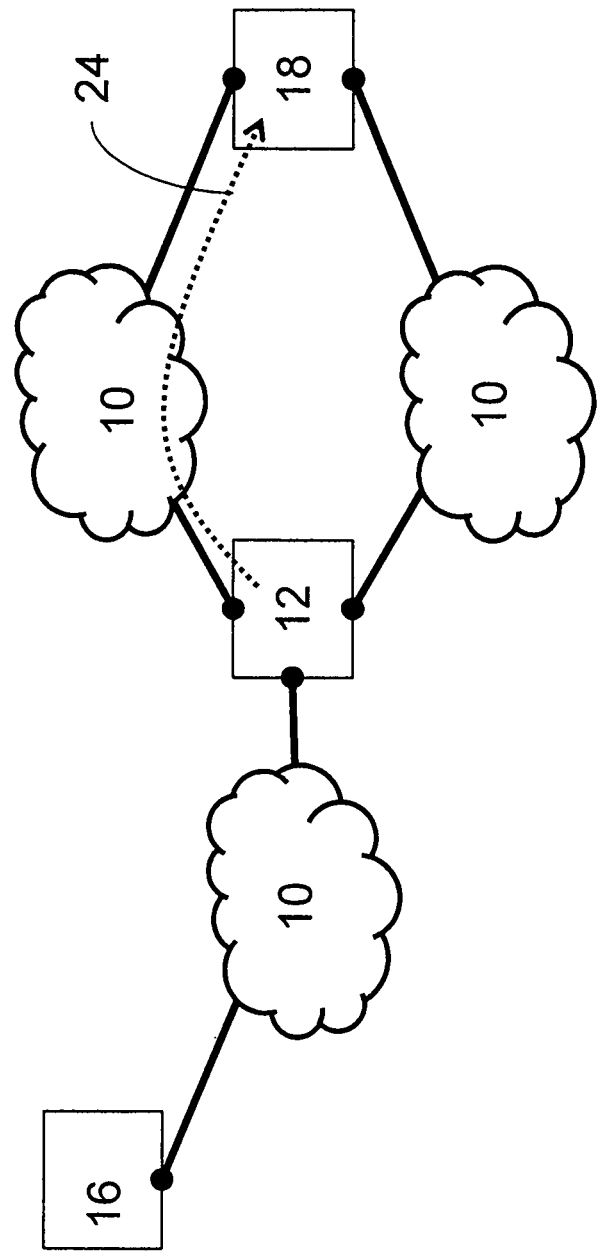
FIG. 6 shows a trust router selecting a route to the network resource.

FIG. 6 shows a trust router 12 selecting a route 24 to the network resource 18.

Figure 7:
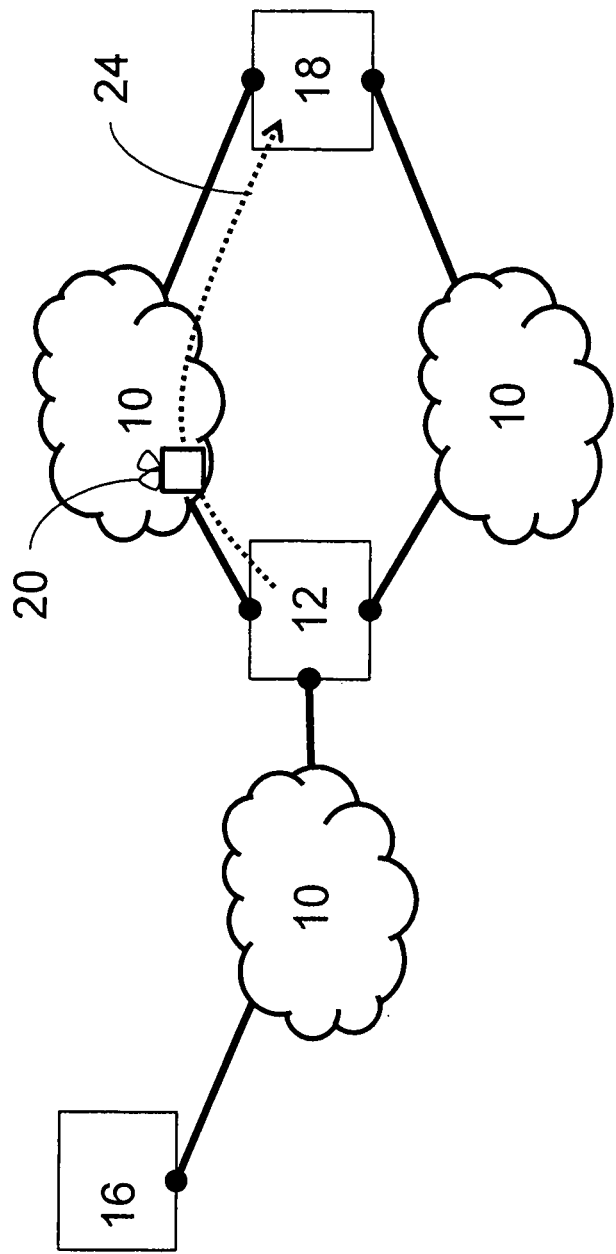
FIG. 7 shows a trust router sending the resource request to the network resource via the selected route.

FIG. 7 shows a trust router 12 sending the resource request 20 to the network resource 18 via the selected route 24S.

Figure 8:
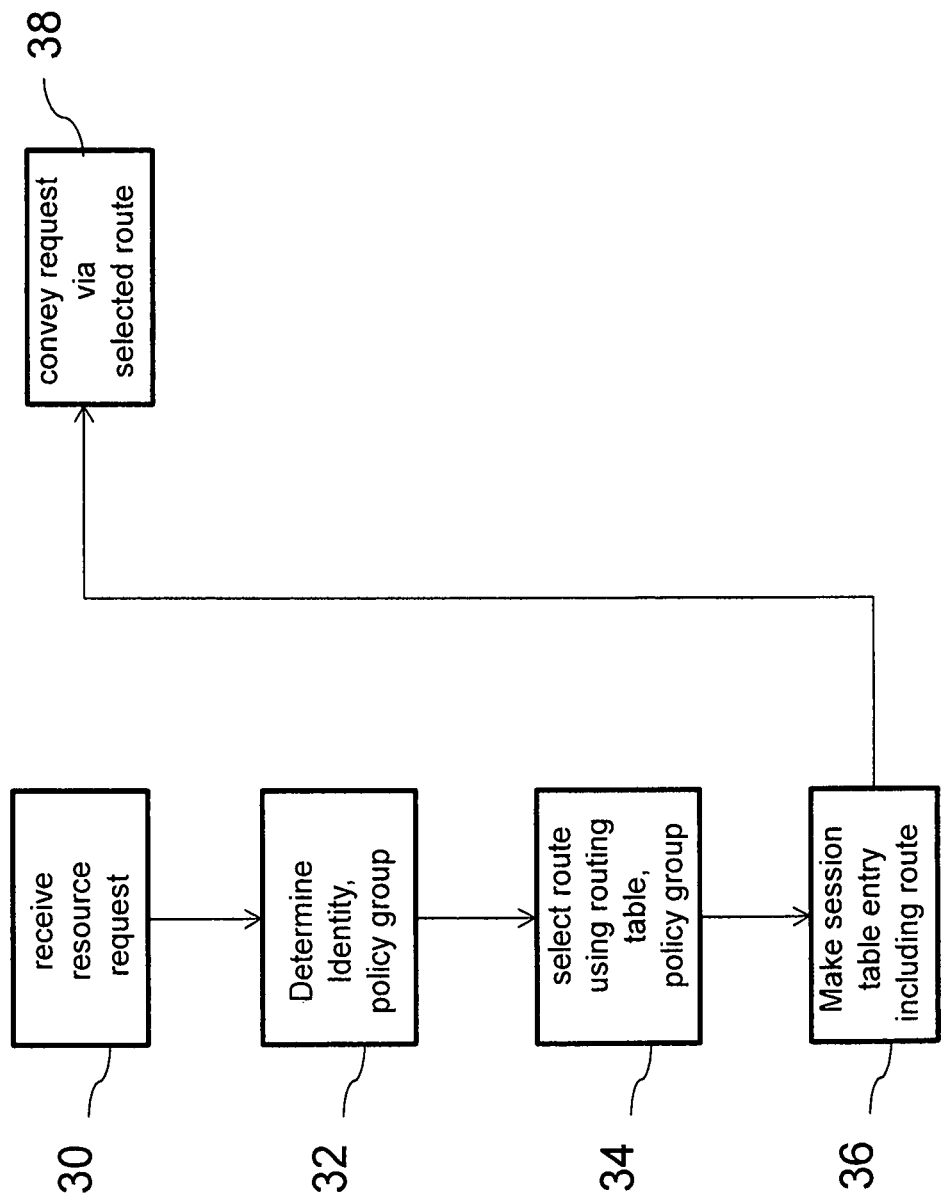
FIG. 8 is a flowchart of a network request being authenticated, the selection of a route and conveyance of the resource request via the selected route.

FIG. 8 shows the logic flowchart for selecting a route.

Figure 9:
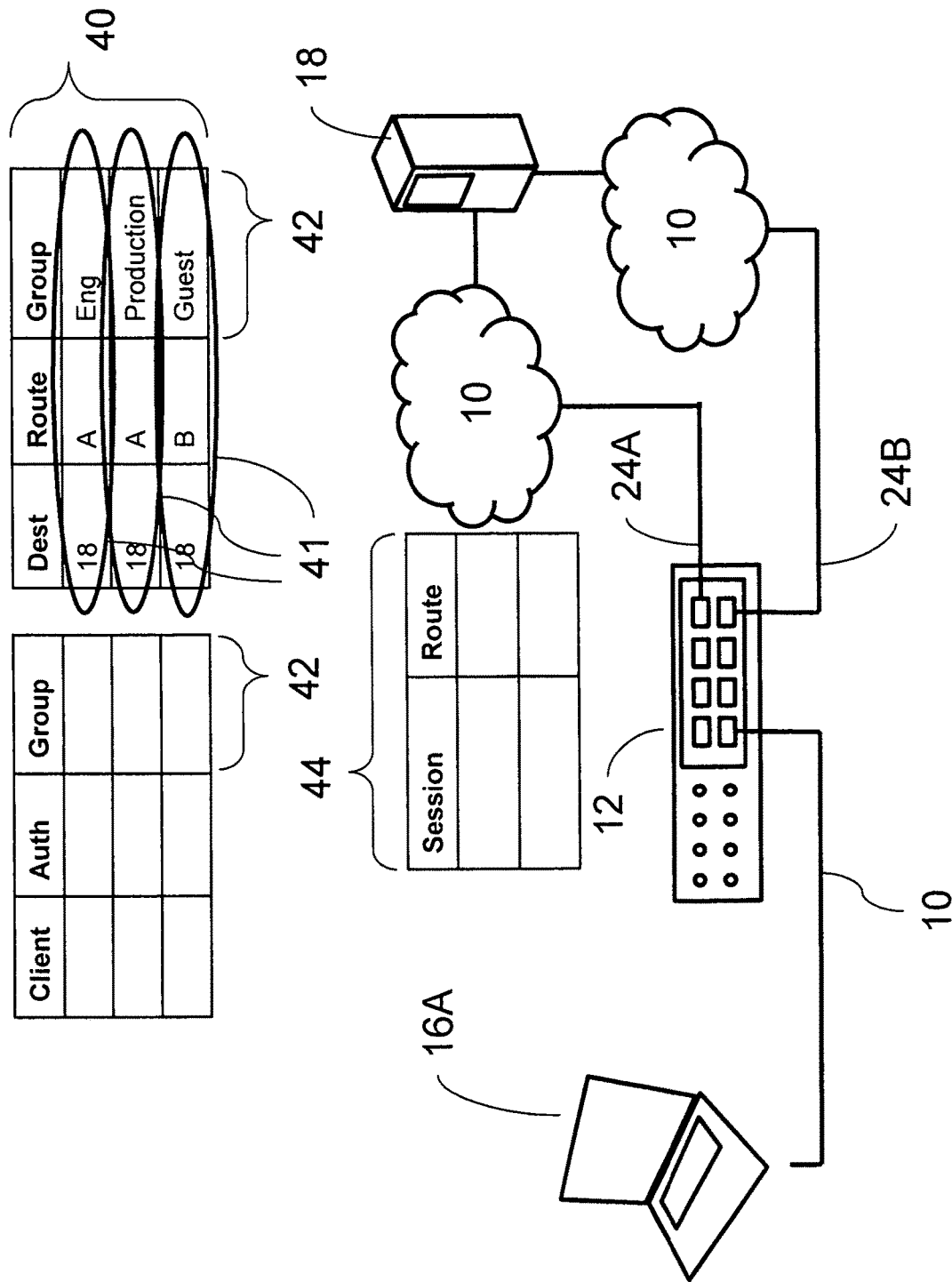
FIG. 9 is an illustration which shows one particular embodiment of the present invention.

FIG. 9 is an illustration which shows an alternate embodiment of the present invention, which includes a plurality of networks 10 connected via a trust router 12. Also connected to individual networks 10 are a network client 16A and a network resource 18. Also shown is the route table 40 including the identity policy group 42 and the session table 44. There are three route table entries 41 in the route table 40, two entries with network route A 24A and one entry with network route B 24B. Each of the entries have a different identity policy group 42.

Figure 10:
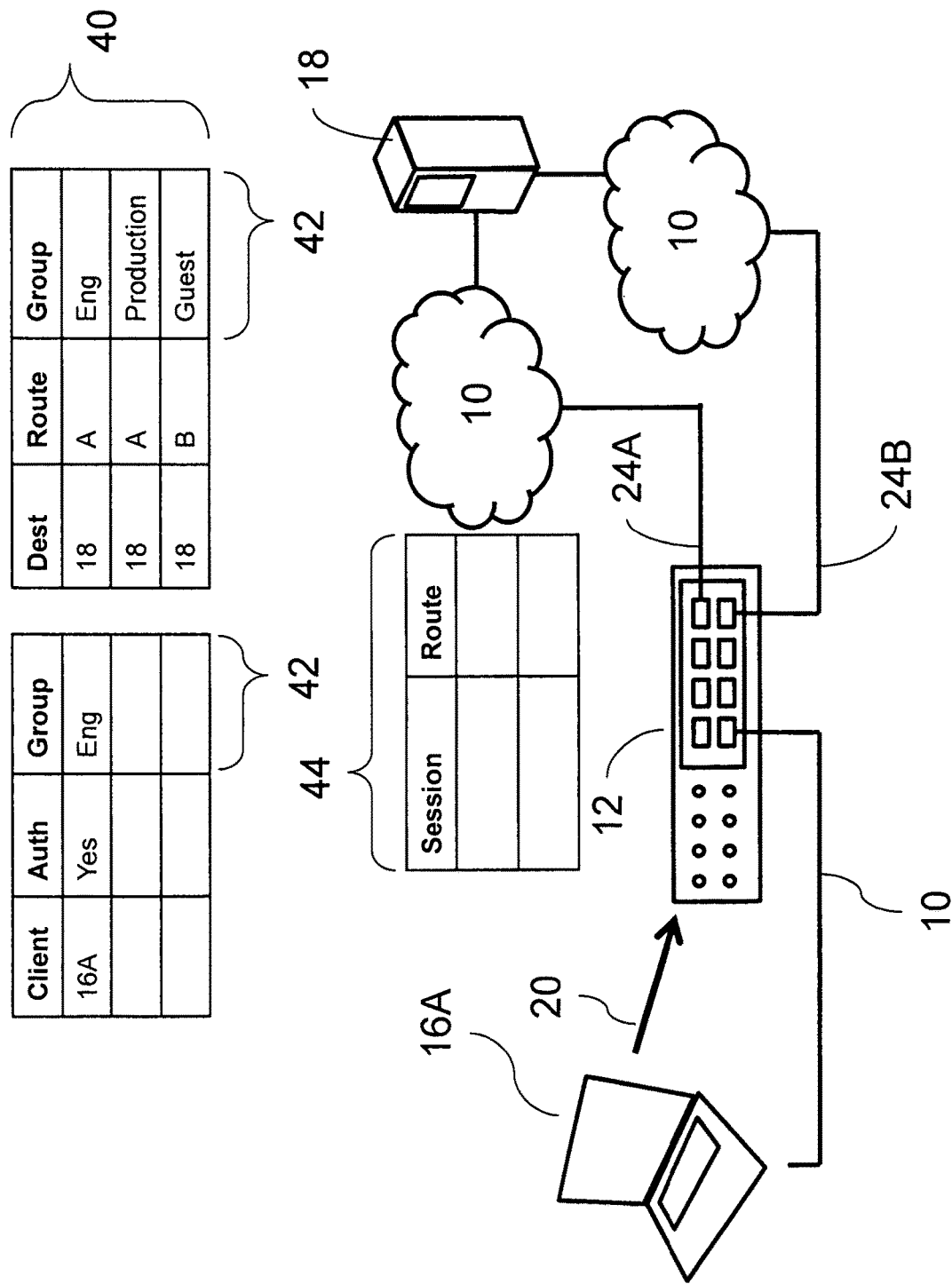
FIG. 10 shows a network client sending a resource request to a trust router.

FIG. 10 shows a network client 16A sending a resource request 20 to the trust router 12. The trust router 12 authenticates the authentication object 22 and determines the identity policy group 42 is "Eng".

Figure 11:
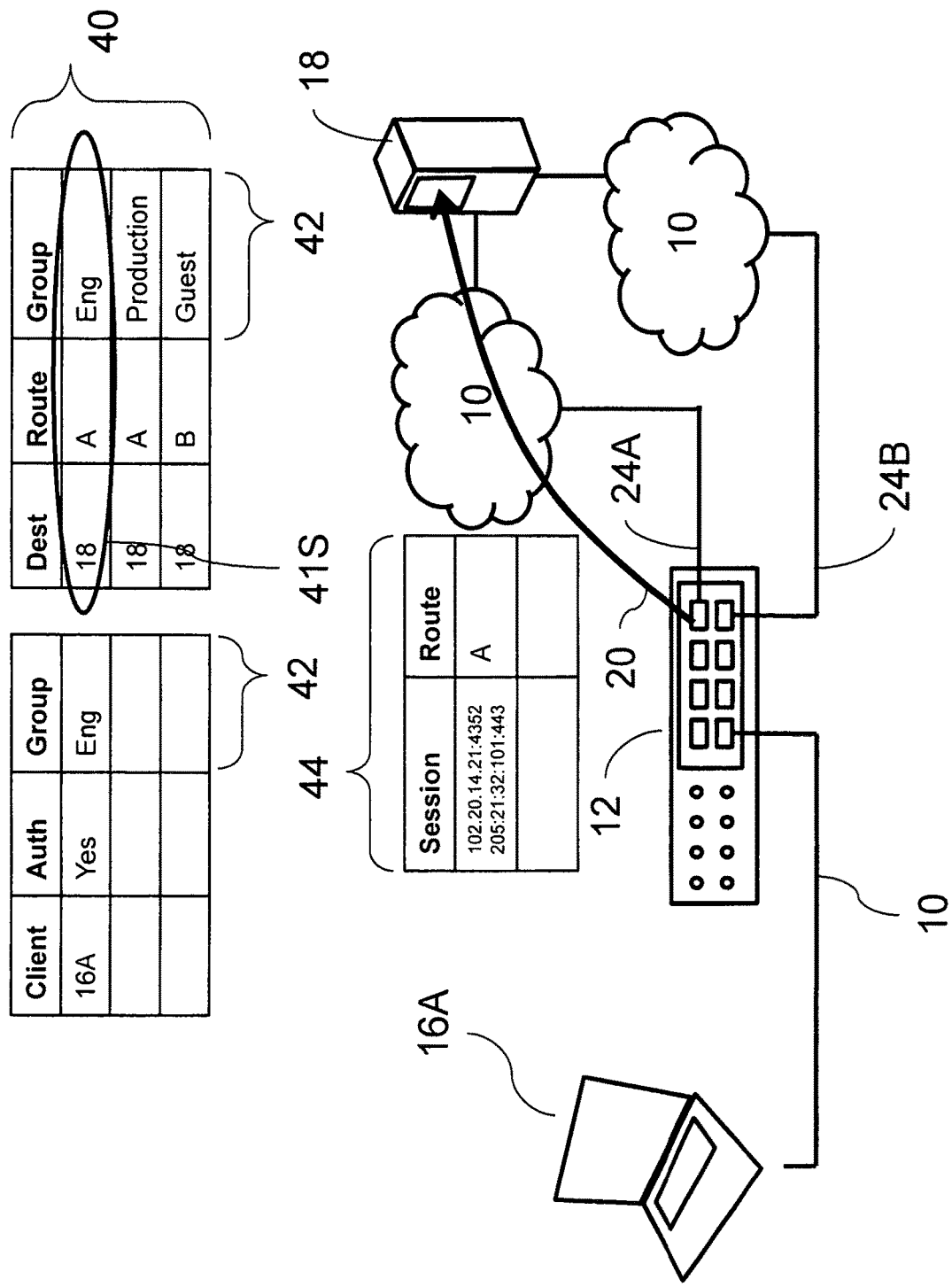
FIG. 11 shows a trust router selecting one of the plurality of routes to the network resource and sending the resource request to the network resource via the selected route.

FIG. 11 shows the trust router 12 selecting a route table entry 41S that matches the destination address and matches the identity policy group. The trust router 12 makes an entry into the session table 44 including the session information and selected route, network route A 24A. The trust router then sends the resource request 20 to the network resource via the selected network route 24S, network route A 24A.

Figure 12:
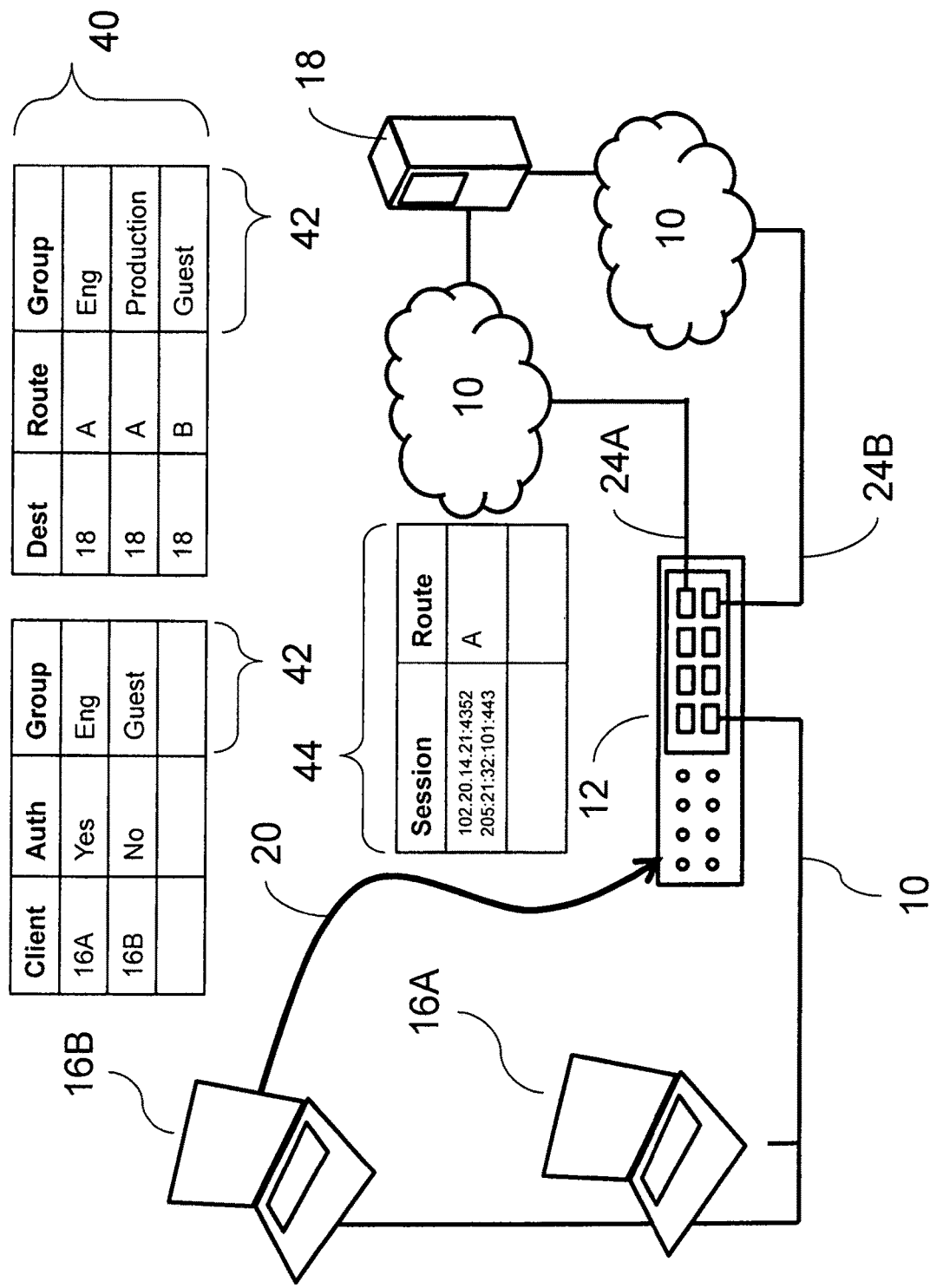
FIG. 12 shows a network client sending a resource request that does not include an authentication object to a trust router.

FIG. 12 shows a network client 16B sending a resource request 20 to the trust router 12. The trust router 12 fails to authenticate the authentication object 22 and determines the identity policy group 42 is "Guest".

Figure 13:
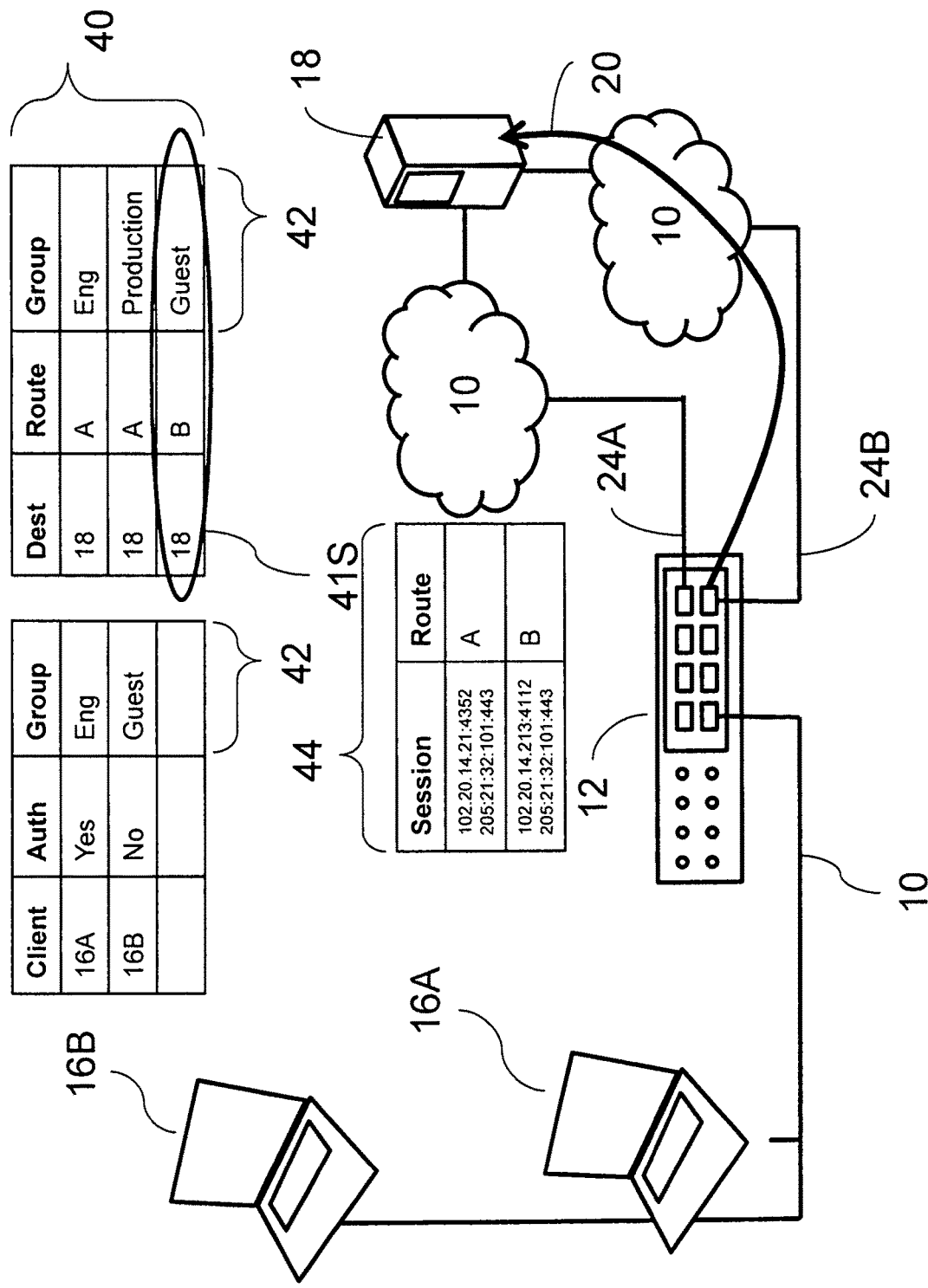
FIG. 13 shows a trust router selecting one of the plurality of routes to the network resource network from a network client sending a resource request that does not include an authentication object to a trust router.

FIG. 13 shows the trust router 12 selecting a route table entry 41S that matches the destination address and matches the identity policy group. The trust router 12 makes an entry into the session table 44 including the session information and selected route, network route B 24B. The trust router then sends the resource request 20 to the network resource via the selected network route 24S, network route A 24B.

VI. Methods of Operation

The present invention provides a trust router 12 that attempts to authenticate resource requests for network sessions and flows before selecting a network route. Network sessions are generally TCP sessions. Network flows are more generic and can be IP, TCP, UDP or other protocol flows, where a flow is a series of related packets. In order to authenticate a session or flow before routing and traffic, an authentication mechanism such as Transport Access Control (TAC) or Statistical Object Identification (SOI) should be used. Other authentication mechanisms may also be employed. Once the trust router 12 has failed or succeeded in authenticating the received resource request 20, an identity policy group is assigned. For an authenticated resource request 20, the identity policy group 42 may be provided by the authenticating entity upon successful authentication. Alternatively, the identity policy group 42 determination may be managed by an associated table or database. Once the identity policy group 42 has been determined, then an attempt is made to select a network route 24 from the route table 40.

The route table entries 41 in the route table 40 have a number of fields including a destination field, a route field and an identity group field. The destination field contains the address of the network or computer that is matched against the destination address of a network packet being routed. Matching the destination field depends on the type of routing being performed; some network are organized so that the address numbers are a hierarchy, enabling least-prefix routing. Another common destination field is a wildcard address that matches any address. This is used to catch all packets and send them along a default route. The route field generally contains the next hop address of the next computer or router in the network. The packet will be sent to the next hop address, moving it closer to its ultimate destination. The identity group field contains an identifier that describes the identity group that the route entry is associated with. The identity group field provides an additional factor for a router with which to make routing decisions. The identity group determined from a network packet is determined from an authentication object provided in a network request. Once the authentication object is authenticated, its identity is determined and grouped into an identity policy group. With this additional policy group information, the trust router can use different network routes for different identity groups of network traffic. For example, a trust router can provide access control to a network that provides access to a management control network. Only network administrators are allowed on this management control network, and their authentication objects indicate that they are network administrators. If the route table entries allowing access to the management control network include only the network administrator identity policy group, then only packets from those network administrators will be routed to the management control network by the trust router. All traffic from other identity groups will be discarded, protecting the management control network.

A route table entry 41' is selected from the route table 40 that matches the destination address of the resource request 20 and matches the determined identity policy group 42. If either of these matches, destination address or identity policy group, cannot be satisfied, then the resource request 20 is discarded. Once a route table entry 41S is selected, the route 24 information contained within it is stored in an entry in the session table 44 with the resource requests's 20 session information. Session information usually includes the source and destination address and the source and destination port numbers. With this information, a network session can be uniquely identified. Once the session table entry has been made, the resource request 20 is routed in accordance with the selected route table entry 41S.

When the authentication of the resource request 20 fails, an alternative, non-authenticated identity policy group 42 may be selected. A route table entry 41 is selected from the route table 40 that matches the destination address of the resource request 20 and matches the alternative identity policy group 42. If either of these matches, destination address or identity policy group, cannot be satisfied, then the resource request 20 is discarded. Once a route table entry 41S is selected, the route 24 information contained within it is stored in an entry in the session table 44 with the resource requests's 20 session information. Once the session table entry has been made, the resource request 20 is routed in accordance with the selected route table entry 41S.

The route selection process is expected to occur on the first packet of a network session of flow. By using the session table, all subsequent packets in the same network session or flow will follow the same path using the route specified in the session table entry. For example, for the TCP protocol, session establishment begins with a network client 16 sending a TCP-SYN packet to the network resource 18. In TCP, session termination is indicated with the TCP-FIN process or the TCP-RST process. Upon receiving a network packet that indicates the network session of flow is ending, the entry in the session table should be removed. Often this is accomplished by accelerating the aging of the ending session table entry. Session tables should also protect themselves against abandoned sessions by aging and removing sessions that have been idle for an extended period of time.

Networks and network routers processing network traffic with bidirectional flows. When a session entry is made, information must also be included to enable traffic responses to be properly processed.

VII. Apparatus for Using Authenticated Requests to Select Protected Routes.

A trust router 12 can be implemented as a standalone network appliance, as a blade in a network equipment chassis, as a blade in a unified threat manager environment, as a virtual appliance within a virtualized network environment, as a component of a virtualization hypervisor and as a cloud computing service. A trust router 12 can be implemented as a Virtual Network Function in a Network Function Virtualization environment. A trust router 12 can be implemented using CPUs, memory, storage and network interfaces. It may also be implemented using custom semiconductors, ASICs, FPGAs, network processors, massively parallel processors, and any combination of hardware and software.

VIII. Examples of Statistical Objection Identification

Figure 14:
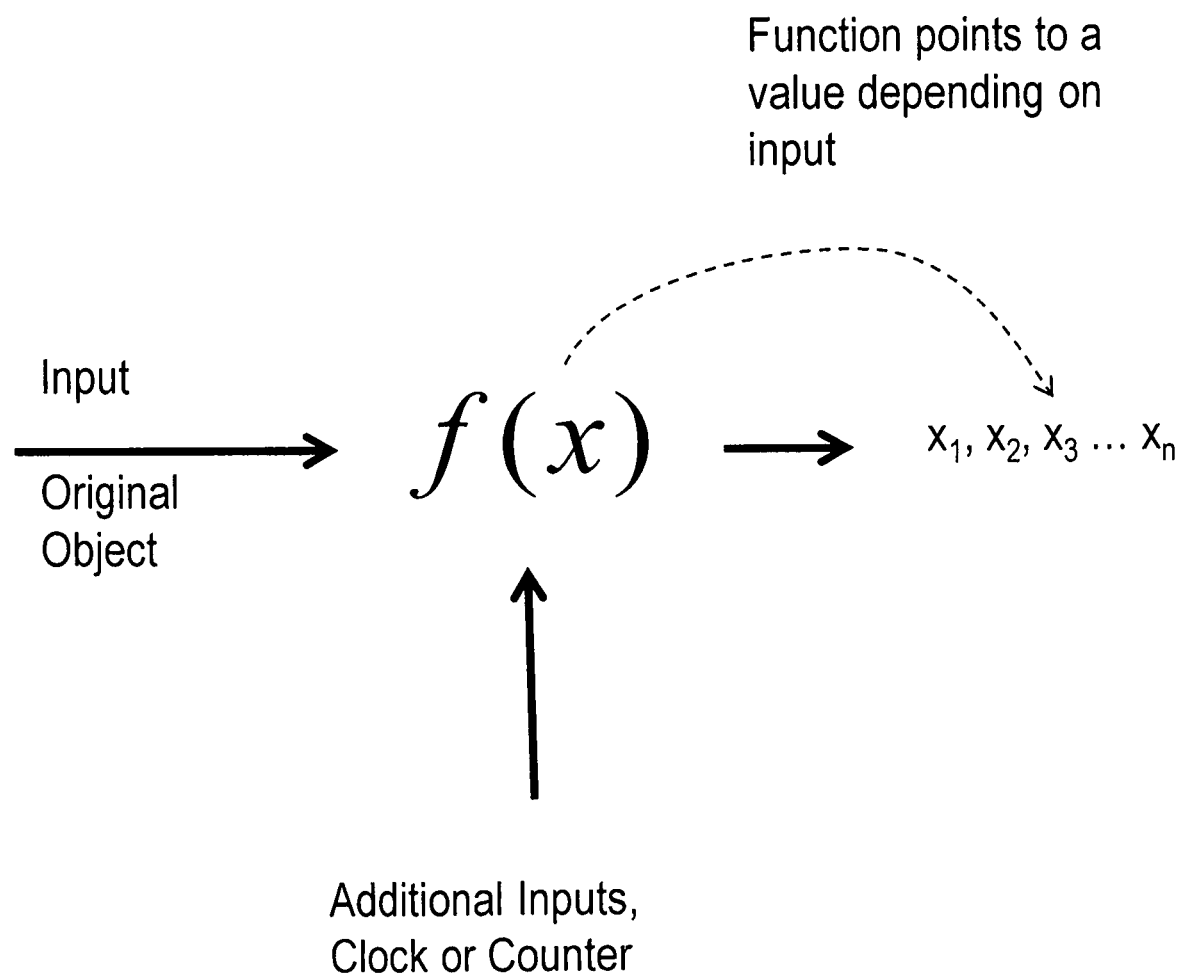
FIG. 14 illustrates the general operation of a hash function.

FIG. 14 illustrates the general operation of a hash function.

Figure 15:
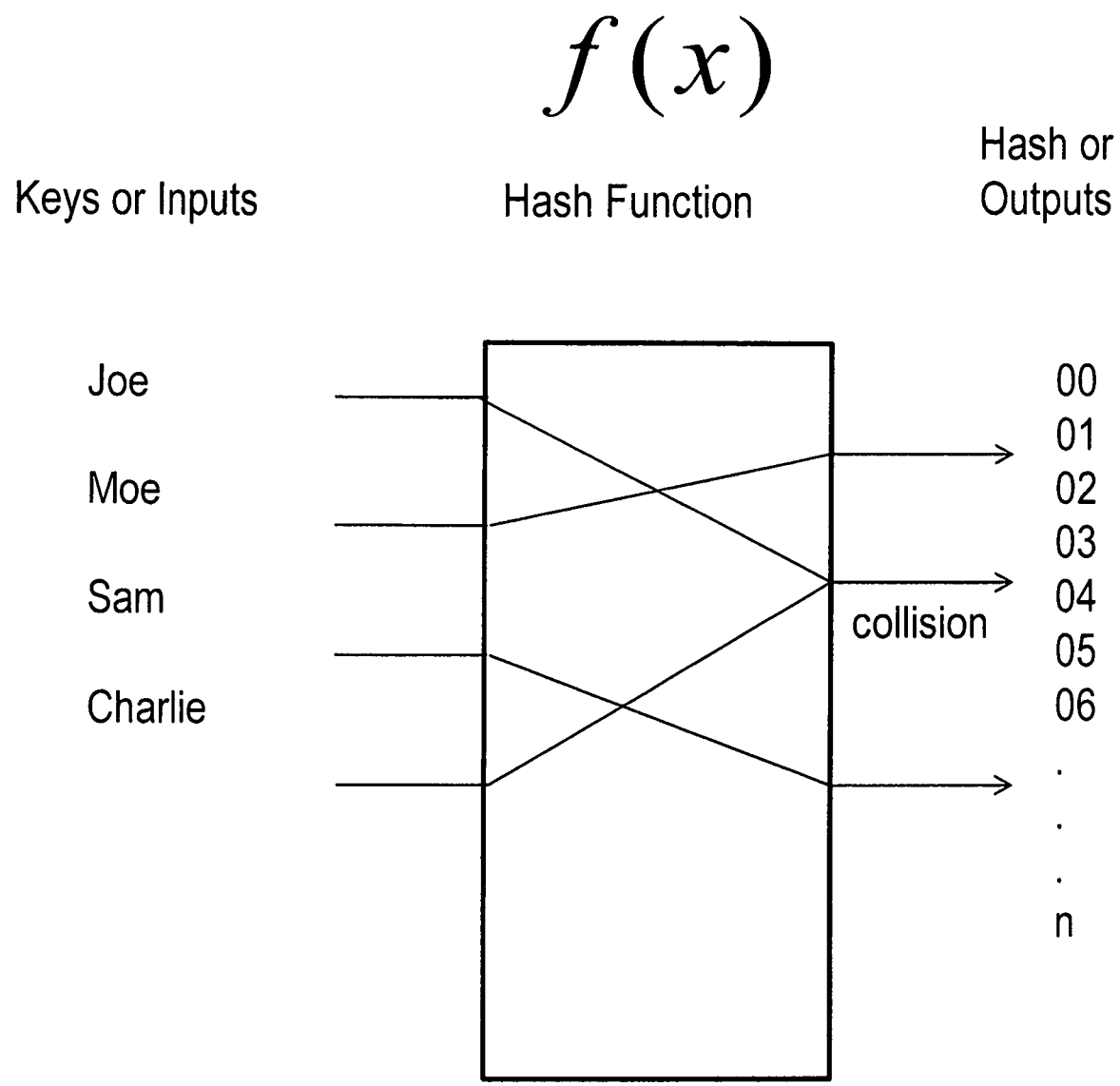
FIG. 15 shows how the hash function, which is illustrated in FIG. 14, maps a set of inputs to a set of outputs.

FIG. 15 shows how the hash function, which is illustrated in FIG. 14, maps a set of inputs to a set of outputs.

Figure 16:
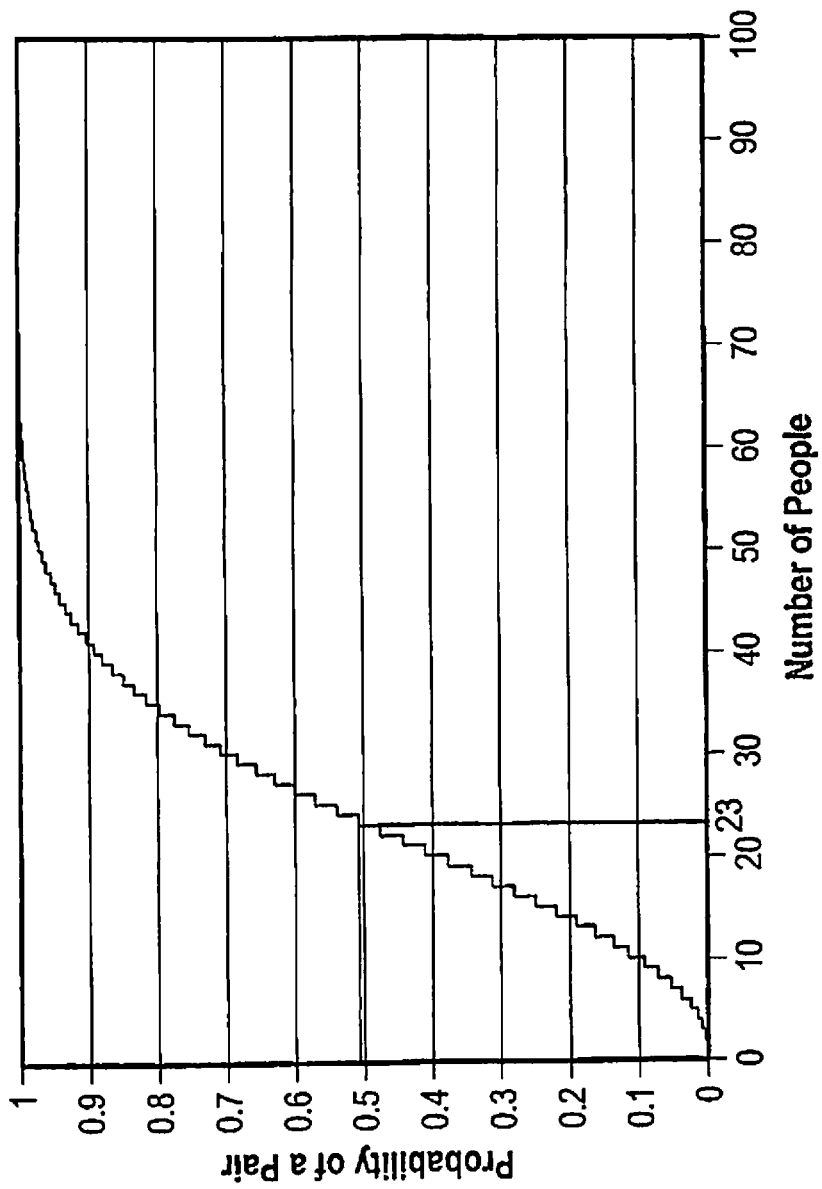
FIG. 16 is a graph that illustrates the birthday problem.

FIG. 16 is a graph that illustrates the birthday problem.

Figure 17:
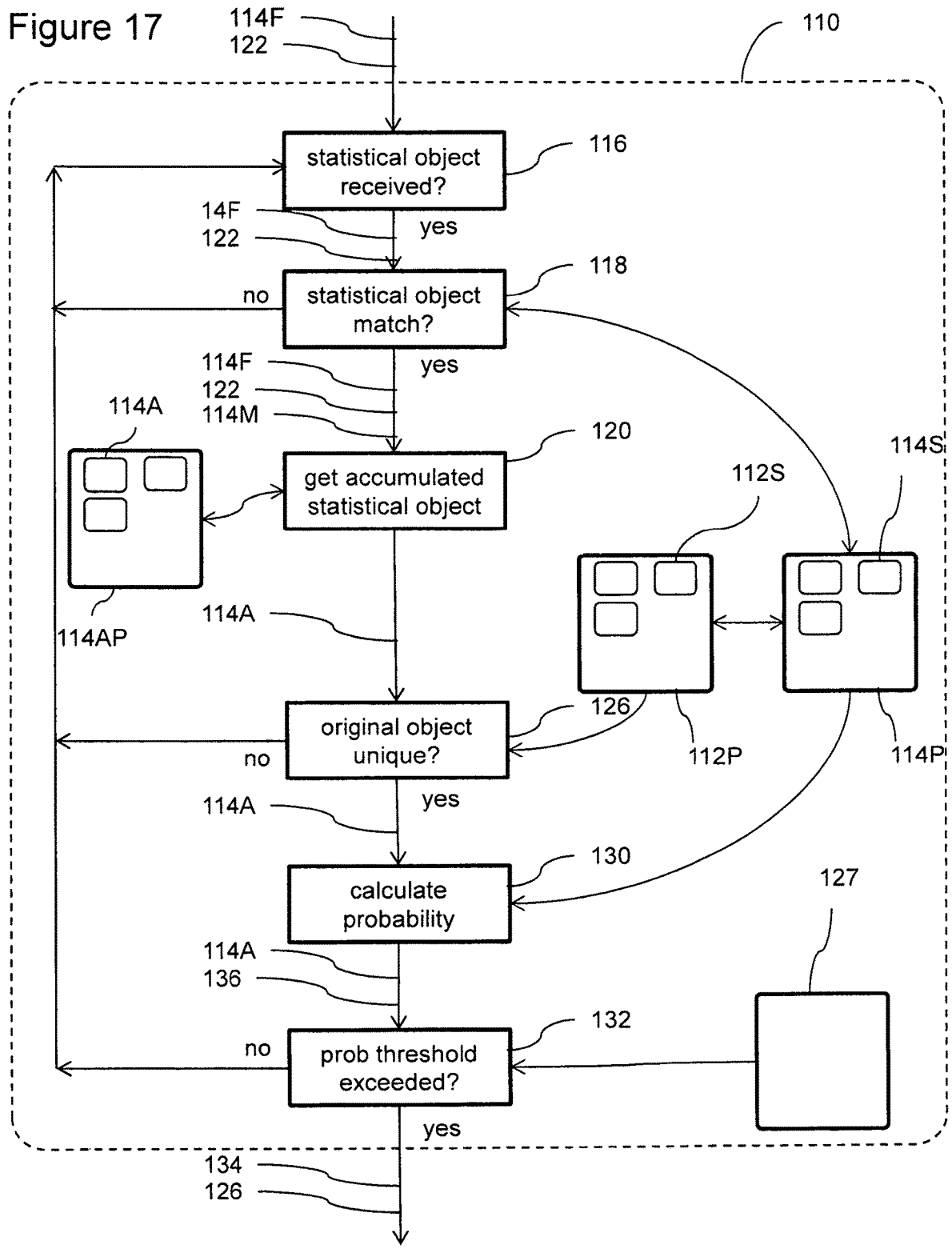
FIG. 17 is an illustration which shows an embodiment of one aspect of the present invention.

FIG. 17 is an illustration which shows an embodiment of one aspect of the present invention.

Figure 18:
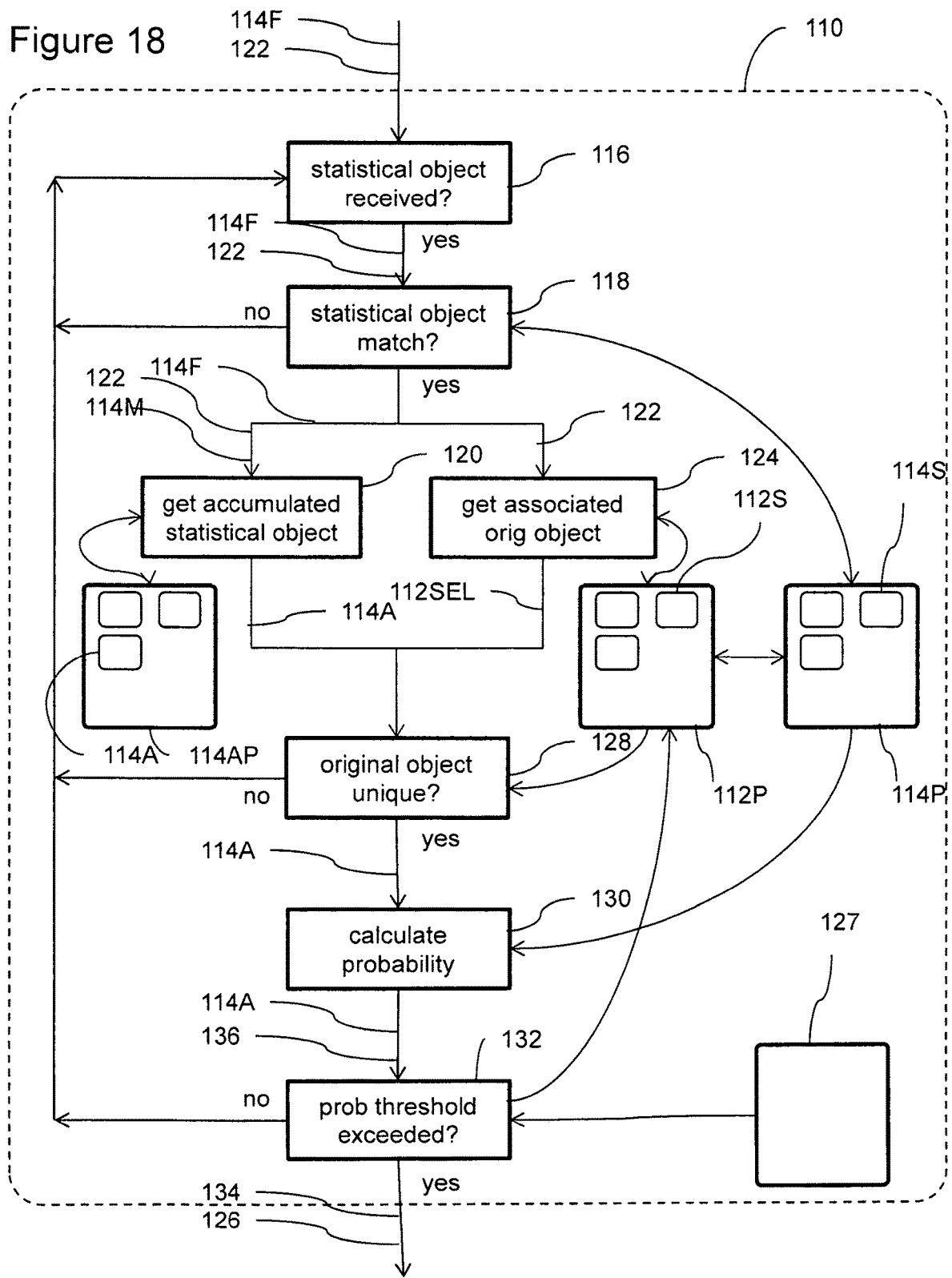
FIG. 18 is an illustration which shows an alternative embodiment of one aspect of the present invention.

FIG. 18 is an illustration which shows an alternative embodiment of one aspect of the present invention.

Figure 19:
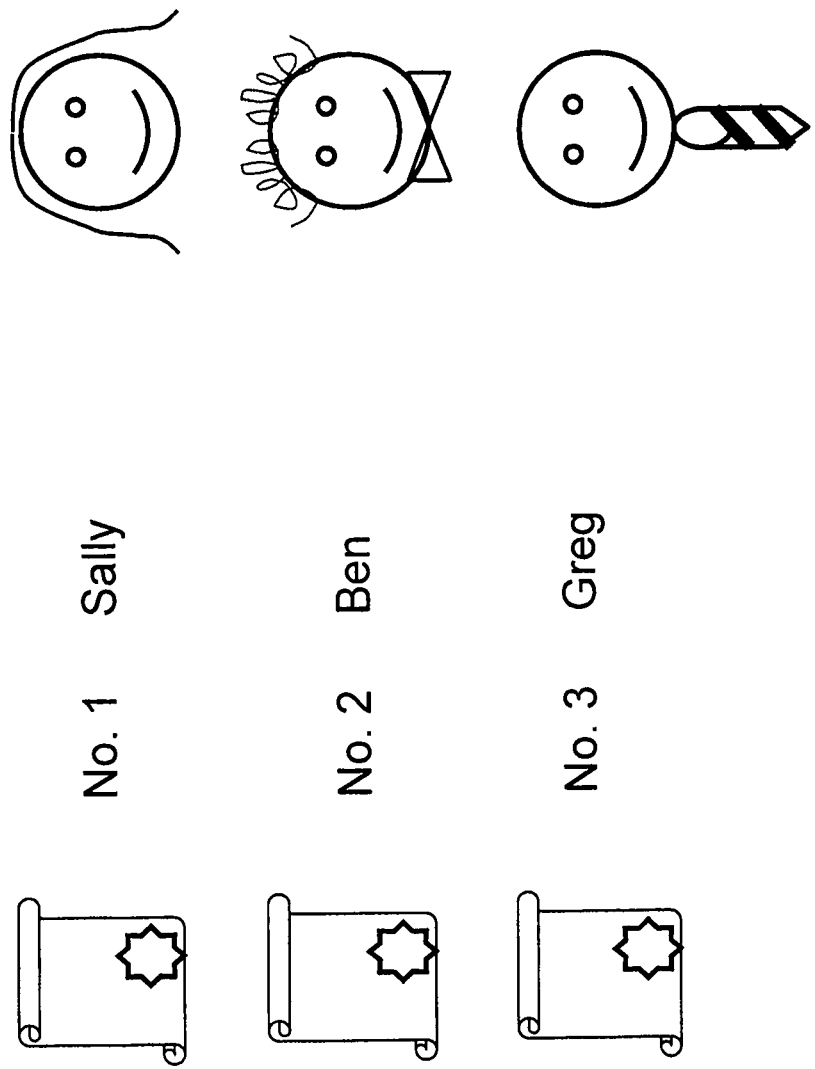
FIG. 19 illustrates certificates that may be used to authenticate a communication.

FIG. 19 illustrates certificates that may be used to authenticate a communication.

Figure 20:
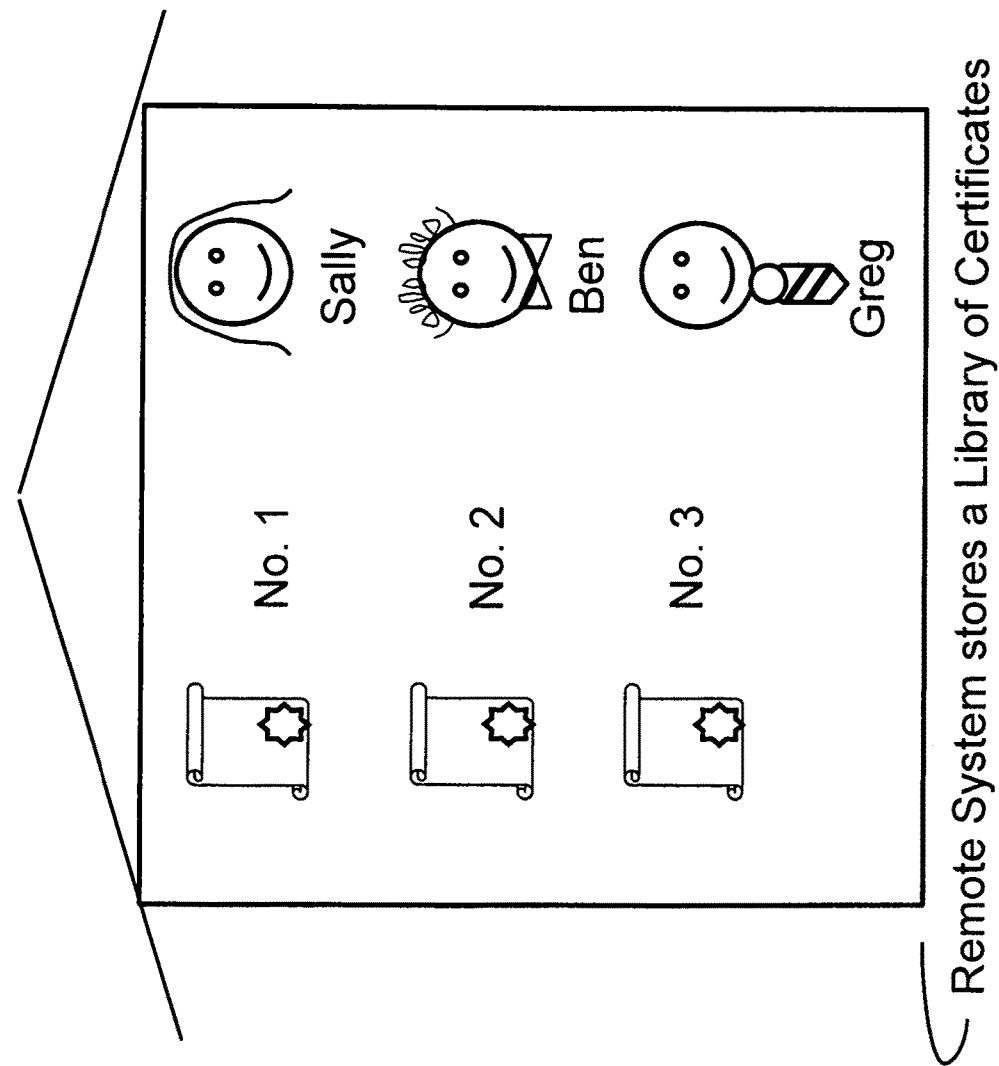
FIG. 20 shows certificates stored in a remote system.

FIG. 20 shows certificates stored in a remote system.

Figure 21:
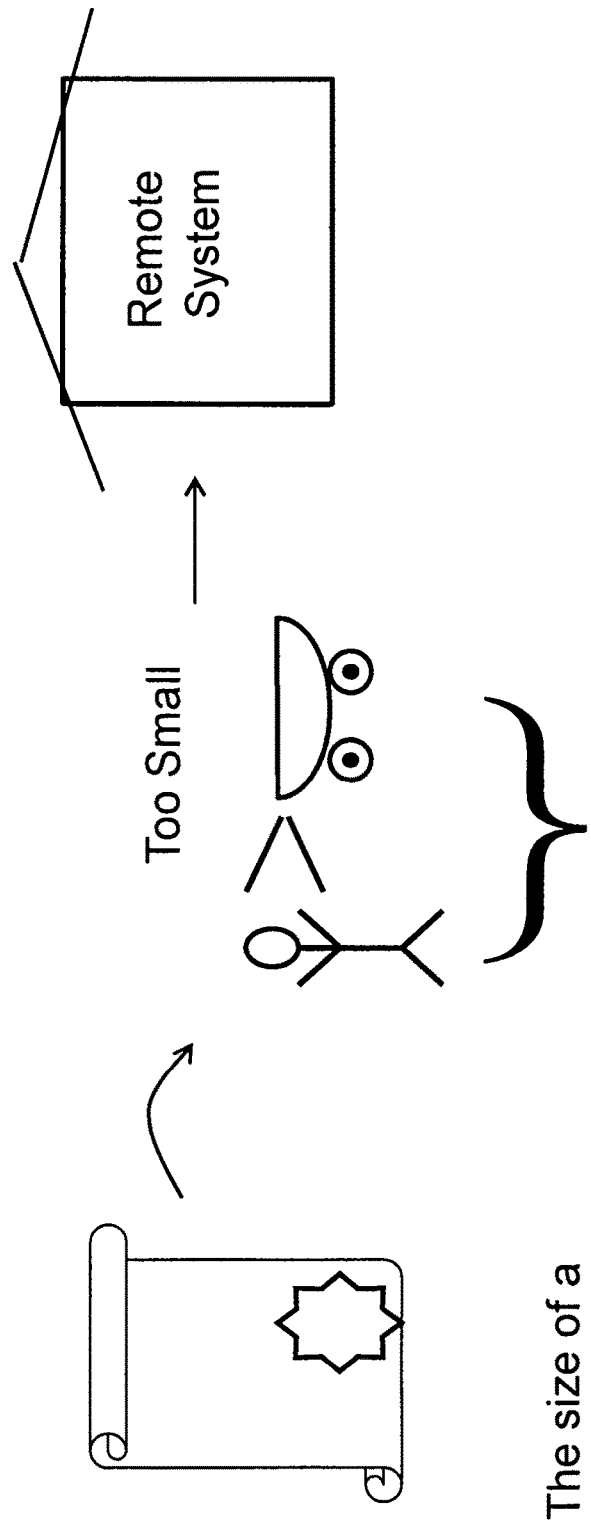
FIG. 21 shows that certificates are too large to send to the remote system in their original form.

FIG. 21 shows that certificates are too large to send to the remote system in their original form.

Figure 22:
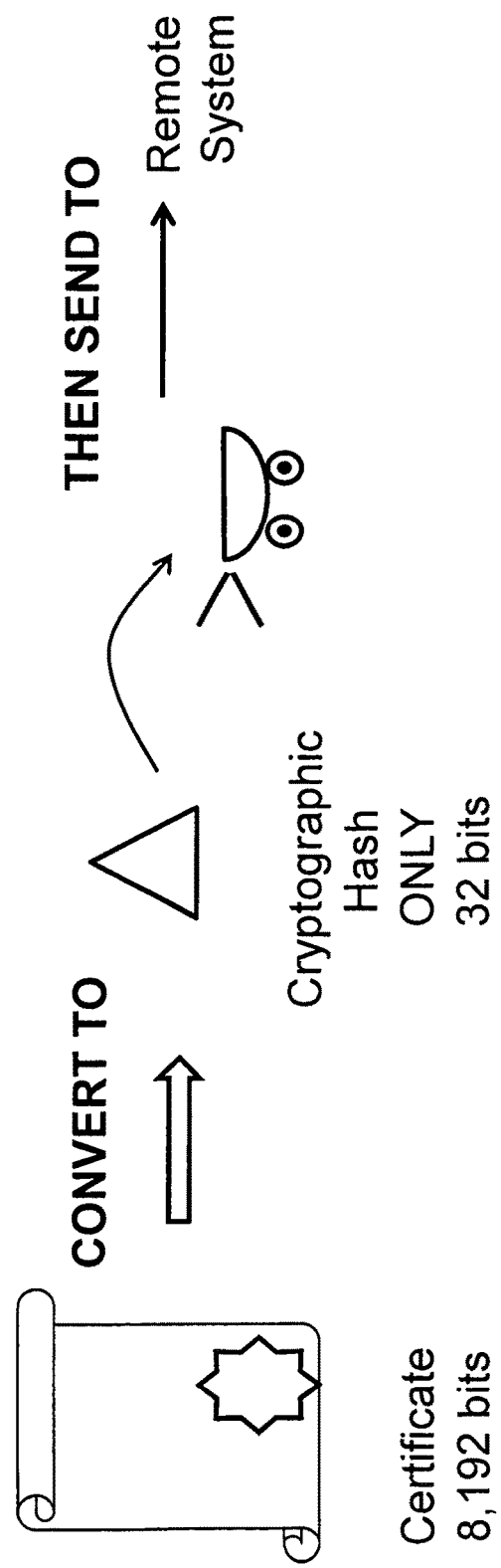
FIG. 22 depicts a solution: converting the certificates, which are original objects, to cryptographic hashes, or statistical objects.

FIG. 22 depicts a solution: converting the certificates, which are original objects, to cryptographic hashes, or statistical objects.

Figure 23:
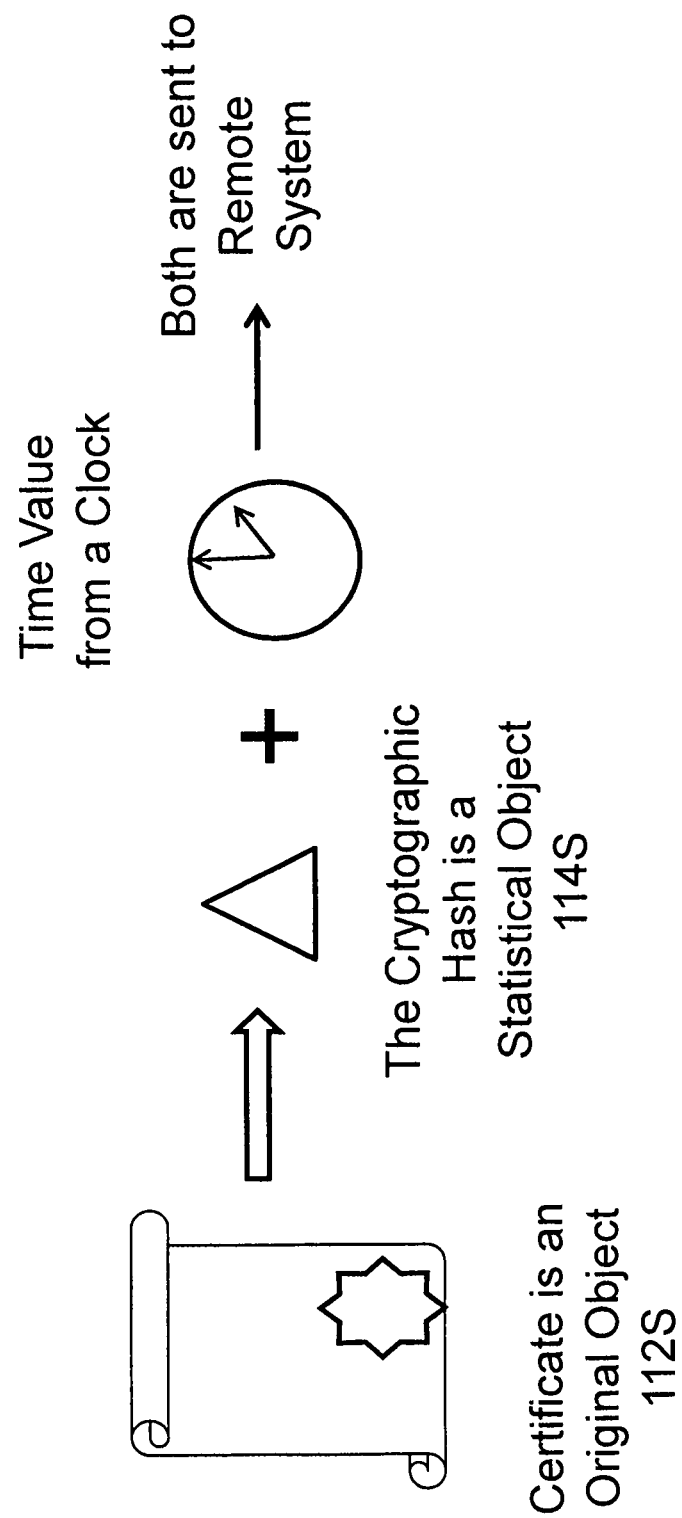
FIG. 23 shows how statistical objects and a time value from a clock are sent to the remote system.

FIG. 23 shows how statistical objects and a time value from a clock are sent to the remote system.

Figure 24:
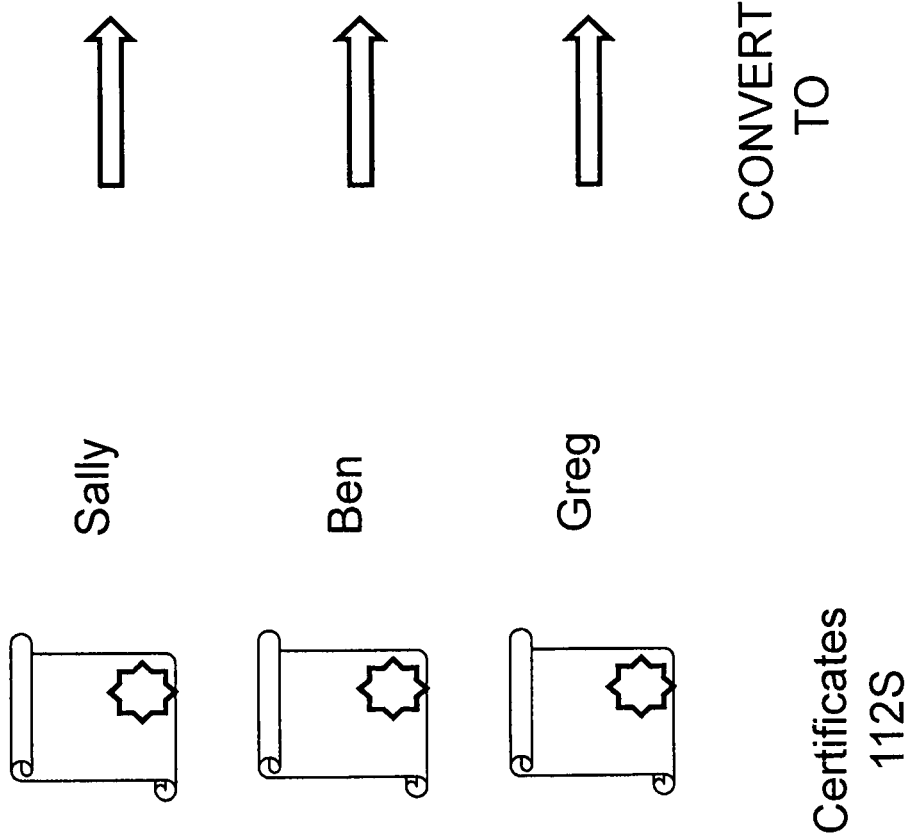
FIG. 24 illustrates the result of the conversion of three original objects to three statistical objects.

FIG. 24 illustrates the result of the conversion of three original objects to three statistical objects.

FIG. 25 furnishes a view of Ben's first communication with the remote system.

FIG. 26 depicts the comparison process that occurs within a statistical object matcher.

FIG. 27 illustrates the role of an accumulated statistical object selector.

FIG. 28 illustrates the function of an accumulated statistical object selector.

FIG. 29 illustrates the task of an original object identifier.

FIG. 30 shows that Ben's first communication has failed to be authenticated.

FIG. 31 supplies a schematic view of Ben's second attempt to communicate with the remote system. b FIG. 32 depicts the second communication, and the resulting match that is produced in the statistical object matcher.

FIG. 33 illustrates the process of finding a match.

FIG. 34 shows how the accumulated statistical object selector discards statistical objects that do not lead to an authenticating match.

FIG. 35 furnishes a view of a probability calculator, which computes the probability of a successful guess of accumulated statistical object information.

FIG. 36 reveals the function of a threshold comparator, which compares the calculated probability to a probability threshold value.

FIG. 37 exhibits the final result, the authentication of Ben's second communication.

IX. Example of One Implementation of the Invention

One specific, simplified example of the present invention is disclosed in this Section of the Specification. The following example offers a description of:

1. an original object 112S;
2. how that original object 112S is transformed into a statistical object 114S; and
3. how that statistical object 114S is identified as having been generated by the original object 112S.

The numbering convention that is used in this Specification, the Drawings, and the Claims to identify original and statistical objects is presented in Table One:

TABLE ONE

| | |
|---|---|
| 110 | Device (In this example, the Remote System) |
| 112M | Matched Original Object |
| 112P | Plurality of Original Objects |
| 112S | Original Object |
| 112SEL | Selected Original Object |
| 114A | Accumulated Statistical Object |
| 114AP | Plurality of Accumulated Statistical Objects |
| 114F | First Statistical Object |
| 114N | New Statistical Object |
| 114S | Statistical Object |

The letter "S" is used to signify a single object, while the letter "P" is used to signify a plurality. The reference character that refers to an original object always includes the numeral "112", while the numeral "114" is always used to refer to a statistical object.

For these examples, we will consider that an original object 112S is an X.509 certificate. An X.509 certificate is used to provide identity, and is digitally signed to prove its authenticity. For this example, the X.509 certificates are 1 KB in size (1024 bytes, 8192 bits). We need to communicate that we are using a specific X.509 certificate to a remote system that has a copy of each X.509 certificate that is expected to be used. Unfortunately, the system was designed before there was a requirement to communicate the X.509 certificates, and there is only enough space to communicate 32 bits worth of information, certainly not enough to send an entire X.509 certificate which is 256 times larger. But still needing to communicate the X.509 certificate, a cryptographic hash, 32 bits in length, is generated for each X.509 certificate and a common clock. The cryptographic hash is a statistical object 114S generated from an original object 112S. Now let us assume that we have 100 of these X.509 certificates, that is 100 original objects 112S. And let us assume that for each original object 112S, we generate a cryptographic hash of each X.509 certificate and a common clock to produce 100 statistical objects 114S each 32 bits in length. For descriptive purposes, three of these X.509 certificates and their corresponding statistical objects will be described. X.509 certificate #1 identifies Sally, and generates a statistical object 114S of value 22443. X.509 certificate #2 identifies Ben, and generates a statistical object 114S of value 32415. X.509 certificate #3 identifies Greg, and also generates a statistical object 114S of value 32415. The device 110 has generated the plurality of statistical objects 114P corresponding to the plurality of original objects 112P.

Now Ben needs to send a communication containing Ben's statistical object to device 110. Device 110 receives Ben's communication using a communications receiver 116. Although we, the narrator, knows that it was Ben that sent the communication to device 110, device 110 does not know this. Ben's communication includes Ben's statistical object (first statistical object 114F) and communications characteristics 122. In this case, the communications occurred over a TCP/IP network and the IP source and destination addresses and the TCP source and destination port numbers are used as communications characteristics 122. The source IP address is 1.1.1.2 and the destination IP address is 1.1.1.3. The source TCP port number is 2000 and the destination TCP port number is 3000. The communications receiver 116 sends the received communications characteristics 122 and Ben's statistical object 114F to the statistical object matcher 118. The statistical object matcher 118 compares Ben's statistical object 114F with the plurality of statistical objects 114P, and determines that there it matches two statistical objects, Ben's and Greg's. The statistical object matcher 118 sends Ben's statistical object 114F, the two matched statistical objects 114M (Ben's and Greg's) and the communications characteristics 122 to the accumulated statistical object selector 120. The accumulated statistical object selector 120 compares Ben's communications characteristics 122 with the plurality of accumulated statistical objects 114AP and finds no matches. Because no matches were found, the accumulated statistical object selector 120 creates a new accumulated statistical object 114A including Ben's statistical object 114F, the two matched statistical objects 114M and the communications characteristics 122. The new accumulated statistical object 114A is added to the plurality of accumulated statistical objects 114AP. The accumulated statistical object information is set to 32 bits to reflect the information contained in statistical object 114F. The accumulated statistical object 114AP is passed to the original object identifier 126. The original object identifier 126 determines that the accumulated statistical object 114AP does not unambiguously identify a single original object 112S. This concludes the operation of the device 110 for the reception of Ben's statistical object. The device 110 does not respond to Ben's communication because it cannot unambiguously determine who sent the communication.

Now Ben, who sent the original communication did not receive a response, so he sends another communication. Since time has passed since the first communication attempt, the clock value used to generate the statistical objects has changed. The new statistical objects and their corresponding X.509 certificates are: X.509 certificate #1 identifies Sally and generates a statistical object 114S of value 84256. X.509 certificate #2 identifies Ben and also generates a statistical object 114S of value 84256. X.509 certificate #3 identifies Greg and generates a statistical object 114S of value 10845. Due to time passing, device 110 regenerates the plurality of statistical objects 114P corresponding to the plurality of original objects 112P which match Sally, Ben and Greg.

Now Ben sends a second communication containing Ben's current statistical object to device 110. Device 110 receives Ben's communication using a communications receiver 116. Ben's communication includes Ben's statistical object 114F and communications characteristics 122. Again, the communications characteristic 122 is source IP address of 1.1.1.2, destination IP address of 1.1.1.3, source TCP port number of 2000 and destination TCP port number of 3000. The communications receiver 116 sends the received communications characteristics 122 and Ben's statistical object 114F to the statistical object matcher 118. The statistical object matcher 118 compares Ben's statistical object 114F with the plurality of statistical objects 114P and determines that there it matches two statistical objects, Ben's and Sally's. The statistical object matcher 118 sends Ben's statistical object 114F, the two matched statistical objects 114M (Ben's and Sally's) and the communications characteristics 122 to the accumulated statistical object selector 120. The accumulated statistical object selector 120 compares Ben's communications characteristics 122 with the plurality of accumulated statistical objects 114AP, and finds a match with Ben's previous communication. The matched accumulated statistical object 114A includes the previous matched statistical object 114M containing Ben and Greg and is compared against the two matched statistical objects 114M matching Ben's statistical object 114F containing Ben and Sally. The intersection of both matched statistical sets is Ben. Greg and Sally are removed from the accumulated statistical object 114A. The accumulated statistical object information increases from 32 bits to 64 bits with the addition of statistical object 114F. The accumulated statistical object 114A is passed to the original object identifier 126. The original object identifier 126 takes the given accumulated statistical object 114A and determines if the accumulated statistical information within the accumulated statistical object could only be generated by a single, unique original object 112S. Original object 112S is Ben's X.509 certificate. Original object 112S is now indicated as selected original object 112SEL, and is passed to the probability calculator 130. The probability calculator 130 takes the given accumulated statistical object 114A, and, based on the number of bits of statistical object information that has been accumulated in the accumulated statistical object 114A and the number of statistical objects in the plurality of statistical objects 114P, calculates the probability of guessing the accumulated statistical object information.

In this example, we have 100 statistical objects and have received 64 bits of statistical object information (32 bits×2). The probability of guessing is calculated by using the formula:

$$p(n;d) \approx 1 - e^{-n^2/(2 \times d)}$$

where n is the number of statistical objects in the table of valid statistical objects;

d is the total number of unique statistical objects available; and d is $d=2^b$ where b is the number of bits of statistical object information received.

Therefore:

$$d=2^{64}, n=100 \text{ resulting in } p(100,2^{64}) \approx 1-e^{-100^2/(2\times 2^{64})}, p(100,2^{64}) \approx 0.$$

In this case, with only a few original objects (100) and a relatively large amount of accumulated statistical object information, the probability of guessing those 64 bits of accumulated statistical object information is vanishingly small, approaching zero. This calculated probability 136 and the accumulated statistical object 122 are passed to the threshold comparator 132. The threshold comparator 132 takes the calculated probability 136 and compares it with the probability threshold value 127. In our example, the probability threshold value 127 is 1 in a million. The threshold comparator 132 determines that our calculated probability 127 of zero is less than the probability threshold value of 1 in a million. Having not exceeded our probability threshold value 127, the threshold comparator 132 makes an indication 130 that includes the selected original object 112SEL Ben. This indication 130 communicates to other functions within the device 110 that the communication was send by Ben and has not exceeded the probability threshold value 127, and that the device 110 should now respond to Ben's communication.

In a second example, we continue with the first example but change the number of original objects 112S from 100 to 100,000,000 (one hundred million). The calculated probability 136 of guessing the accumulated statistical object 114A with 64 bits of information is 2.674%, greater than the probability threshold value of 1 in a million. Since this is greater than the threshold, this concludes the operation of the device 110 for the reception of Ben's statistical object. The device 110 does not respond to Ben's communication because it has exceeded the probability threshold value 127. Now Ben, who sent the original communications again did not receive a response, so he sends another communication. Device 110 receives Ben's communication using a communications receiver 116. Ben's communication includes Ben's statistical object 114F and communications characteristics 122. Again, the communications characteristic 122 is source IP address of 1.1.1.2, destination IP address of 1.1.1.3, source TCP port number of 2000 and destination TCP port number of 3000. The communications receiver 116 sends the received communications characteristics 122 and Ben's statistical object 114F to the statistical object matcher 118. The statistical object matcher 118 compares Ben's statistical object 114F with the plurality of statistical objects 114P and determines that there it matches only a single statistical object, Ben's. The statistical object matcher 118 sends Ben's statistical object 114F, the matched statistical object 114M (Ben's) and the communications characteristics 122 to the accumulated statistical object selector 120. The accumulated statistical object selector 120 compares Ben's communications characteristics 122 with the plurality of accumulated statistical objects 114AP, and finds a match with Ben's previous communication. The matched accumulated statistical object 114A includes the previous matched statistical object 114M containing only Ben and is compared against the matched statistical object 114M matching Ben's statistical object 114F containing Ben. The intersection of both matched statistical sets is Ben. The accumulated statistical object information increases from 64 bits to 96 bits with the addition of statistical object 114F. The accumulated statistical object 114A is passed to the original object identifier 126. The original object identifier 126 takes the given accumulated statistical object 114A and determines if the accumulated statistical information within the accumulated statistical object could only be generated by a single, unique original object 112S. Original object 112S is Ben's X.509 certificate. Original object 112S is now indicated as selected original object 112SEL, and is passed to the probability calculator 30. The probability calculator 130 takes the given accumulated statistical object 122, and, based on the number of bits of statistical object information that has been accumulated in the accumulated statistical object 122 and the number of statistical objects in the plurality of statistical objects 114P, calculates the probability of guessing the accumulated statistical object information. In a second example, we continue with the first example but change the number of original objects 112S from 100 to 100,000,000 (one hundred million). The calculated probability 136 of guessing the accumulated statistical object 114A with 96 bits of information is again vanishingly small, approaching zero. This calculated probability 136 and the accumulated statistical object 122 are passed to the threshold comparator 132. The threshold comparator 132 takes the calculated probability 136 and compares it with the probability threshold value 127. The threshold comparator 132 determines that our calculated probability 127 of 0 is less than the probability threshold value of 1 in a million. Having not exceeded our probability threshold value 127, the threshold comparator 132 makes an indication 30 that includes the selected original object 112SEL Ben. This indication 30 communicates to other functions within the device 110 that the communication was send by Ben and has not exceeded the probability threshold value 127 and that the device 110 should now respond to Ben's communication.

In a third example, we continue with the second example and add an association of the selected original object 112SEL (Ben) and the communications characteristics 122. This allows for the optimization of subsequence communication requests from Ben.

Continuing with the third example, Ben makes another communication to device 110 during which within device 110 an association exists between Ben's original object and the communications characteristics 122 of Ben's previous communication. Device 110 receives Ben's communication using a communications receiver 116. Ben's communication includes Ben's statistical object (first statistical object 114F) and communications characteristics 122. This time, the communications characteristics 122 is source IP address of 1.1.1.2, destination IP address of 1.1.1.3, source TCP port number of 5000 and destination TCP port number of 7000. The source IP address is the same source IP address that was used in the prior, accepted communications. The statistical object matcher 118 compares Ben's statistical object 114F with the plurality of statistical objects 114P, and determines that there it matches two statistical objects, Ben's and Greg's. The statistical object matcher 118 sends Ben's statistical object 114F, the two matched statistical objects 114M (Ben's and Greg's) and the communications characteristics 122 to the accumulated statistical object selector 120 and sends the communications characteristics 122 to the associated original object selector 124. The accumulated statistical object selector 120 compares Ben's communications characteristics 122 with the plurality of accumulated statistical objects 114AP and finds no matches. Because no matches were found, the accumulated statistical object selector 120 creates a new accumulated statistical object 114A including Ben's statistical object 114F, the two matched statistical objects 114M and the communications characteristics 122. The new accumulated statistical object 114A is added to the plurality of accumulated statistical objects 114AP. The accumulated statistical object information is set to 32 bits to reflect the information contained in statistical object 114F. The accumulated statistical object selector 120 sends the accumulated statistical object 114A to the associated original object identifier 128.

The associated original object selector 124 receives the communications characteristics 122, and compares them with the communications characteristics 122 associated with the plurality of original objects 112P. Because an association exists between Ben's original object and Ben's communications characteristics 122, the associated original object selector 124 selects Ben's original object, indicated as 112SEL and passes the selected original object 112SEL to the associated original object identifier 128.

The associated original object identifier 128 takes the accumulated statistical object 114A and the selected original object 112SEL (Ben) and insures that the accumulated statistical object 114A could have been generated from the selected original object 112SEL. Upon determining that the accumulated statistical object 114A was producable by the selected original object 112SEL, the intersection of the original objects 114 is calculated using the original objects associated with the matched statistical objects 114M (Ben and Greg) and the selected original object 112SEL (Ben) resulting in Ben. This intersection is indicated in the accumulated statistical object 114A. Since there is exactly one original object now contained in the accumulated statistical object 114A, the accumulated statistical object 114A is sent to the probability calculator 130.

The probability calculator 30 takes the given accumulated statistical object 114A, and, based on the number of bits of statistical object information that has been accumulated in the accumulated statistical object 114A and the number of statistical objects in the plurality of statistical objects 114P, calculates the probability of guessing the accumulated statistical object information.

In this example, we have 100,000,000 statistical objects and have received 32 bits of statistical object information, but we have only a single statistical object that is associated with the Ben's communications characteristics 122. Therefore, instead of using 100,000,000 as the number of statistical objects, the number of statistical objects is 1, resulting in a calculated probability 36 of $p=\frac{1}{2}^{32}$. This calculated probability 136 and the accumulated statistical object 122 are passed to the threshold comparator 132. The threshold comparator 132 takes the calculated probability 136 and compares it with the probability threshold value 127. The threshold comparator 132 determines that our calculated probability 127 of $p=\frac{1}{2}^{32}$ is less than the probability threshold value of 1 in a million. Having not exceeded our probability threshold value 127, the threshold comparator 132 makes an indication 130 that includes the selected original object 112SEL Ben. This indication 130 communicates to other functions within the device 110 that the communication was send by Ben and has exceeded the probability threshold value 127 and that the device 110 should now respond to Ben's communication. It should be noted that in this third example, because we are using the communications characteristics 122 associated with the original object 112, we can arrive at an selected original object 112SEL and not exceed the probability threshold value 127 while receiving fewer bits of information from the received statistical object 114F.

X. Preferred and Alternative Embodiments of a Trust Router and a Trust Level Controller FIG. 38 is an illustration which shows an embodiment of the present invention, which includes a plurality of networks 10A, 10B, 10C connected via a trust router 12. Connected to networks 10A, 10B and 10C are network resources 18A, 18B and 18C respectively. Also connected to network 10 is network client 16A. Also shown is the route table 40 including the identity policy group 42 and the trust level 200. Connected to the trust router 12 is the trust level controller 202. There are six route table entries 41 in the route table 40, three entries of trust level 3, two entries of trust level 2 and one entry of trust level 1. Each of the entries have the same identity policy group 42.

FIG. 39 is an illustration which shows an embodiment of the present invention, as described in FIG. 38 highlighting the three route table entries 41 for Identity Policy Group 42 "Ops" at trust level 200 "3". The network paths described by those route table entries are shown 204A, 204B, 204C.

FIG. 40 is an illustration which shows an embodiment of the present invention, as described in FIG. 38 highlighting the two route table entries 41 for Identity Policy Group 42 "Ops" at trust level 200 "2". The network paths described by those route table entries are shown 204B, 204C.

FIG. 41 is an illustration which shows an embodiment of the present invention, as described in FIG. 38 highlighting the route table entry 41 for Identity Policy Group 42 "Ops" at trust level 200 "1". The network paths described by those route table entries are shown 204C.

FIG. 42 is an illustration which shows details of a trust level controller. Within the trust level controller 202 is a CPU 206. Connected to the CPU 206 is memory 208 and within the memory 208 are the CPU instructions 210. Connected to the trust level controller 202 and the CPU 206 are sensor inputs 212. These sensor inputs may be real-time sensors, historical information from a storage system, or any other source of information that could be used by multivariate analysis. Also connected to the trust level controller 202 and the CPU 206 is the trust level 200. The trust level 200 is an output of the trust level controller 202.

The sensor inputs 212 are processed by custom-designed CPU instructions 210 which are specially configured for the present invention, and which run on the CPU 206. This process causes the CPU 206 and memory 208 to change their state, and to produce a trust level 200, which is a beneficial result that is employed by a user to insure the safety of a network.

In one embodiment of the invention, the trust level 200 is a measure, signification or prediction of the risk associated with a particular user who wishes to connect to or to use a protected secured network. The trust level 200 is an empirical measurement of previous activity by the user. Based on these activities, a trust level 200 is computed by a trust level controller 202, which enables the operator of the network to decide whether or not to allow access by that user.

In one embodiment, the trust level controller 202 is an apparatus which includes sensor inputs 212 which is fed to a CPU 206, a memory 208 connected to the CPU 206, CPU instructions 210 which is stored in the memory 208, and an trust level output. In one embodiment, the trust level 200 is expressed as an integer within a specific range that extends from a level of "no trust/high risk" to "fully trustworthy." In one embodiment, the selection of the number of trust levels available to the trust level controller 202 is configured by a security administrator. Trust levels may be a simple as a hi/lo arrangement or more complex with multiple level between the highest and lowest levels. Trust levels may be orthogonal to each other. In an orthogonal definition, trust level policies are not subsets of other trust level policies, but they are instead policies unique to each specific trust level that may or may not overlap.

In this embodiment, the trust level controller 202 is an apparatus that changes state based on the sensor inputs 212 to the CPU 206. The CPU 206 runs custom designed CPU instructions 210 which are specially designed to determine the trustworthiness of the potential user, and produces an output which provides a specific prediction of risk to the network. This prediction of risk provides a beneficial result to the operator of the network which is only supplied by the combination of elements in this embodiment of the invention.

The apparatus and/or methods that are utilized in this embodiment of the invention are separate and agnostic from the portion of the invention which uses authenticated requests to select network routes.

XI. Methods of Operation of a Trust Router and a Trust Level Controller

The present invention provides a trust router 12 that authenticates resource requests for network sessions and flows before selecting a network route. Network sessions are generally TCP sessions. Network flows are more generic and can be IP, TCP, UDP or other protocol flows, where a flow is a series of related packets. In order to authenticate a session or flow before routing and traffic, an authentication mechanism such as Transport Access Control (TAC) or Statistical Object Identification (SOI) should be used. Other authentication mechanisms may also be employed. An authentication object 22, contained within the resource request 20, is the element being authenticated. The authentication object 22 contains identity information. Once the trust router 12 has failed or succeeded in authenticating the received resource request 20, the authenticated identity an identity policy group 42 is assigned. For an authenticated resource request 20, the identity policy group 42 may be provided by the authenticating entity upon successful authentication. Alternatively, the identity policy group 42 determination may be managed by an associated table or database. Once the identity policy group 42 is assigned, a trust level 200 is determined for the identity object 22. The trust level is provided by a trust level controller 202.

A trust level controller 202 is a device or system that has information outside of the routing information available to the trust router 12. In one embodiment, the trust level controller 202 is an analytics system that monitors the behavior of all users an enterprise. This analytics system takes input from many sources including computer applications the users are using, access key use reporting from building entries and exits, and network security monitoring systems. Since the analytics system uses such a broad range of inputs, it is able to detect trends and patterns of individual users and detect deviations from these patterns. For instance, if user Steve, with a default trust level of "3", usually works on four different computer system and one day starts working on a different computer system, the behavioral analytics system can detect this change. A system based only on identity cannot make this differentiation if all of the accesses are authorized. This capability to couple an analytics system with identity is necessary to detect insider threats and stolen identity credentials. In the above example, when Steve starts accessing a different computer system, the analytics system will detect this change in behavior and, acting as a trust level controller 202, communicate Steve's identity and a new trust level 200 of "2" to the trust router 12. This will change how the trust router 12 routes traffic from Steve.

Using trust level enables a trust level controller to select between multiple policies of enforcement on a single identity without requiring policy redefinition. This limits the policies specified by a trust level controller to a pre-configured set, isolating policy definition from policy selection. In a security environment, the analytics performing the trust level controller tasks can only choose between those pre-set policies. Those pre-set policies would be defined by a security administrator. This separation of duties increases the overall security of a system employing trust level.

Once the identity policy group 42 and the trust level 200 has been determined, then an attempt is made to select a network route 24 from the route table 40. The route table entries 41 in the route table 40 have a number of fields including a destination field, a route field, an identity group field and a trust level field. The destination field contains the address of the network or computer that is matched against the destination address of a network packet being routed. Matching the destination field depends on the type of routing being performed; some network are organized so that the address numbers are a hierarchy, enabling least-prefix routing. Another common destination field is a wildcard address that matches any address. This is used to catch all packets and send them along a default route. The route field generally contains the next hop address of the next computer or router in the network. The packet will be sent to the next hop address, moving it closer to its ultimate destination. The identity group field contains an identifier that describes the identity group that the route entry is associated with. The identity group field provides an additional factor for a router with which to make routing decisions. The identity group determined from a network packet is determined from an authentication object provided in a network request. Once the authentication object is authenticated, its identity is determined and grouped into an identity policy group. The trust level field contains the trust level 200.

With this additional policy group information and the trust level information, the trust router can use different network routes for different identity groups of network traffic and can use different network routes for different trust levels within an identity group. For example, if we have three networks 10A, 10B, 10C and their respective resources 18A, 18B, 18C. Network 10A has highly sensitive resources that only a few users are allowed to access and only when the user has a high trust ranking. Network 10B is for regular users at high and medium trust rankings. Network 10C is for users with low trust rankings. Allying this to the real world, network 10A only allows access to the public internet and does not allow access to internal company resources. Network 10B is the normal internal company network. Network 10C contains a computer used for initiating financial transactions. While the three networks described here 10A, 10B, 10C are subsets of one another, this is not a requirement. The route table entries 41 for each trust level 200 can be independent of the route table entries 41 of any other trust level 200.

A route table entry 41 is selected from the route table 40 that matches the destination address of the resource request 20 and matches the determined identity policy group 42 and matches the trust level 200 associated with the identity information contained in the authentication object 22 of the resource request 20. If any of these matches, destination address, identity policy group or trust level, cannot be satisfied, then the resource request 20 is discarded. Once a route table entry 41S is selected, the route 24 information contained within it is stored in an entry in the session table 44 with the resource requests's 20 session information. Session information usually includes the source and destination address and the source and destination port numbers. With this information, a network session can be uniquely identified. Once the session table entry has been made, the resource request 20 is routed in accordance with the selected route table entry 41S.

The route selection process is expected to occur on the first packet of a network session or flow. By using the session table, all subsequent packets in the same network session or flow will follow the same path using the route specified in the session table entry. For example, for the TCP protocol, session establishment begins with a network client 16 sending a TCP-SYN packet to the network resource 18. In TCP, session termination is indicated with the TCP-FIN process or the TCP-RST process. Upon receiving a network packet that indicates the network session of flow is ending, the entry in the session table should be removed. Often this is accomplished by accelerating the aging of the ending session table entry. Session tables should also protect themselves against abandoned sessions by aging and removing sessions that have been idle for an extended period of time.

Networks and network routers processing network traffic with bidirectional flows. When a session entry is made, information must also be included to enable traffic responses to be properly processed.

In the FIG. 39, client 16A is authenticated and in Identity Policy Group "Ops" with an assigned trust level 200 of "3". At trust level 200 "3", client 16A is able to access network resource A 18A via network route A 24A, network resource B 18B via network route B 24B, and network resource C 18C via network route C 24C. When the trust level controller 202 changes the trust level 200 assigned to client 16A to "2", client 16a is then able to access network resource B 18B via network route B 24B, and network resource C 18C via network route C 24C. At trust level 200 "2", client 16A is no longer able to access network resource A 18A via network route A 24A. When the situation that caused the trust level to drop from "3" to "2" has been remediated, the trust level controller 202 will send the identity of client 16A and a trust level of "3" to the trust route, restoring the access to network resource A 18A via network route A 24A. The present invention enables an entity external to the routing infrastructure to change routing policy within a set of preset policies, described by the various route table entries at various trust levels. The trust level controller 202 selects between the present trust levels 200. In this way, the trust router 12 can apply different policies based on the trust level 200 presently associated with the provided identity object. The trust level for an identity can be updated as frequently as desired by the trust level controller 202.

XII. Apparatus for a Trust Level Controller

A trust level controller 202 can be implemented as a standalone network appliance, as a blade in a network equipment chassis, as a blade in a unified threat manager environment, as a virtual appliance within a virtualized network environment, as a component of a virtualization hypervisor and as a cloud computing service. A trust level controller 202 can be implemented as a Virtual Network Function in a Network Function Virtualization environment. A trust level controller 202 can be implemented using CPUs, memory, storage and network interfaces. It may also be implemented using custom semiconductors, ASICs, FPGAs, network processors, massively parallel processors, and any combination of hardware and software. A trust level controller 202 may be part of an analytics system, an artificial intelligence system or big data system.

CONCLUSION

Although the present invention has been described in detail with reference to one or more preferred embodiments, persons possessing ordinary skill in the art to which this invention pertains will appreciate that various modifications and enhancements may be made without departing from the spirit and scope of the claims that follow. The various alternatives for providing an efficient means for statistical object identity that have been disclosed above are intended to educate the reader about preferred embodiments of the invention, and are not intended to constrain the limits of the invention or the scope of Claims. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

10 Network
10A Network A
10B Network B
10C Network C
12 Trust Router
16 Network Client
16A Network Client A
16B Network Client B
18 Network Resource
18A Network Resource A
18B Network Resource B
18C Network Resource C
20 Resource Request
22 Authentication Object
24 Network Route
24A Network Route A
24B Network Route B
24C Network Route C
24S Selected Network Route
30 Flowchart 1, step 1
Flowchart 1, step 2
Flowchart 1, step 3
Flowchart 1, step 4
Flowchart 1, step 5
40 Route Table
41 Route Table Entry
41S Selected Route Table Entry
42 Identity Policy Group
44 Session Table
110 Device (Remote System)
112M Matched Original Object
112P Plurality of Original Objects
112S Original Object
112SEL Selected Original Object
114A Accumulated Statistical Object
114AP Plurality of Accumulated Statistical Objects
114F First Statistical Object
114M Matching Statistical Object
114MA Matching Accumulated Statistical Object
114MP Plurality of Matching Statistical Objects
114N New Statistical Object
114P Plurality of Statistical Objects
114S Statistical Object
116 Communications Receiver
118 Statistical Object Matcher
120 Accumulated Statistical Object Selector
122 Communications Characteristics
124 Associated Original Object Selector
126 Original Object Identifier
127 Probability Threshold Value
128 Associated Original Object Identifier
130 Probability Calculator
132 Threshold Comparator
134 Indication
136 Calculated Probability
(All components from 112M to 136 are included in device 110).
200 Trust Level
202 Trust Level Controller
204A Network Path A
204B Network Path B
204C Network Path C
206 CPU
208 Memory
210 CPU Instructions
212 Sensor Inputs

What is claimed is:

1. A method performed by a group of devices comprising the steps of:
providing a network;
providing a network resource; said network resource being connected to said network;
said network resource including an address;
providing a Trust Router; said Trust Router being connected to said network; said Trust Router including a route table; said route table having at least one route table entry to a network resource;
providing a network client; said network client being connected to said network;
conveying, by said network client, a resource request over said network to said Trust Router;
said resource request including the address of said network resource;
said resource request containing an authentication object;
said authentication object including identity information;
providing an Identity Policy Group; said Identity Policy Group being located within said Trust Router;
providing a Trust Level; said Trust Level being received by said Trust Router;
using said identity in said authentication object to authenticate said network client;

using, by said Trust Router, said authentication object to determine an Identity Policy Group and said Trust Level;

selecting a route table entry that matches the destination address of said resource request and that matches said Identity Policy Group and that matches said Trust Level;

identifying, by said Trust Router, a forwarding table entry that matches said destination address of said resource request and said Identity Policy Group and said Trust Level;

conveying, by said trust router, said resource request to said network resource via a next hop information in said selected route table entry; and using said Identity Policy Group and said destination address to select a route for said resource request to said address of said network resource.

2. The method as recited in claim 1, in which:
said resource request is a TCP-SYN packet.

3. The method as recited in claim 1, in which:
said authentication object contained in said resource request is a statistical object.

4. The method as recited in claim 1, in which:
said resource request is an IP packet.

5. The method as recited in claim 1, in which:
said Trust Level is employed for the purpose of changing access to network resources without changing route table entries.

6. A method comprising the steps of: providing a network; providing a network resource; said network resource being connected to said network; said network resource including an address;

providing a Trust Router; said Trust Router being connected to said network; said Trust Router including a route table; said route table including a plurality of route table entries; each of said route table entries including an Identity Policy Group and a Trust Level;

providing a network client; said network client being connected to said network;

conveying, by said network client, a resource request over said network to said Trust Router;

said resource request containing an authentication object; and including a destination address;

said authentication object including identity information;

using, by said Trust Router, said authentication object to authenticate said network client and determining the associated Identity Policy Group and said associated Trust Level;

determining that none of said plurality of route table entries in said route table matches said destination address of said resource request and matches said Identity Policy Group and matches said Trust Level; and discarding said resource request.

7. The method as recited in claim 6, in which:
said resource request is a TCP-SYN packet.

8. The method as recited in claim 6, in which:
said authentication object contained in said resource request is a statistical object.

9. The method as recited in claim 6, in which:
said resource request is a IP packet.

* * * * *